US008989608B2

(12) United States Patent
Asano et al.

(10) Patent No.: US 8,989,608 B2
(45) Date of Patent: Mar. 24, 2015

(54) ROTATING MECHANISM DRIVING APPARATUS, IMAGE FORMING APPARATUS, NON-TRANSITORY READABLE MEDIUM IN WHICH COMPUTER PROGRAM FOR EXECUTING METHOD FOR DRIVING THE ROTATING MECHANISM IS RECORDED, ROTATING MECHANISM DRIVING SYSTEM AND IMAGE FORMING SYSTEM

(75) Inventors: Yoshihiro Asano, Kanagawa (JP); Takahisa Koike, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 493 days.

(21) Appl. No.: 13/369,826

(22) Filed: Feb. 9, 2012

(65) Prior Publication Data

US 2012/0207493 A1 Aug. 16, 2012

(30) Foreign Application Priority Data

Feb. 15, 2011 (JP) .................................. 2011-029760
Sep. 20, 2011 (JP) .................................. 2011-204825

(51) Int. Cl.
*G03G 15/00* (2006.01)
*G03G 21/16* (2006.01)
(Continued)

(52) U.S. Cl.
CPC .......... *G03G 15/757* (2013.01); *G03G 21/1647* (2013.01); *F16H 57/01* (2013.01);
(Continued)

(58) Field of Classification Search
CPC ................ F16D 35/00; F16D 2500/10487
USPC ................... 399/36; 192/58.4, 58.61
See application file for complete search history.

(56) References Cited

U.S. PATENT DOCUMENTS 4,250,983 A * 2/1981 Handke ........................ 192/12 D
4,768,609 A * 9/1988 Taga et al. ..................... 180/249
(Continued)

FOREIGN PATENT DOCUMENTS

CN 1495571 A 5/2004
JP S5562460 A 5/1980
(Continued)

OTHER PUBLICATIONS

Chinese Office Action dated Mar. 27, 2014 issued in corresponding Chinese Application No. 201210082828.7 (with English translation).

*Primary Examiner* — David Gray
*Assistant Examiner* — Geoffrey Evans
(74) *Attorney, Agent, or Firm* — Harness, Dickey & Pierce P.L.C.

(57) ABSTRACT

A rotating mechanism driving apparatus is disclosed that includes a frictional transmission configured to output torque via a viscous fluid, the torque being input from the motor; an input shaft rotational amount detecting part configured to detect a rotational amount of an input shaft of the frictional transmission; an output shaft rotational amount detecting part configured to detect a rotational amount of an output shaft of the frictional transmission; an input torque detecting part configured to detect input torque of the frictional transmission; a slip amount calculating part configured to calculate a slip amount between the input shaft and the output shaft; and abnormal state determining part configured to determine abnormal state of a rotating mechanism connected to the output shaft of the frictional transmission based on the input torque and to determine an abnormal state of the frictional transmission based on the slip amount.

12 Claims, 12 Drawing Sheets

(51) Int. Cl.
  *F16H 57/01*  (2012.01)
  *F16H 59/46*  (2006.01)

(52) U.S. Cl.
  CPC .............. *G03G2221/1639* (2013.01); *G03G 2221/1642* (2013.01); *F16D 2500/10487* (2013.01); *F16D 2500/30406* (2013.01); *F16D 2500/5108* (2013.01); *F16H 2057/018* (2013.01); *F16H 2059/465* (2013.01)
  USPC .......... 399/36; 399/167; 192/58.4; 192/58.61

(56) References Cited

U.S. PATENT DOCUMENTS

| | | | | |
|---|---|---|---|---|
| 4,776,233 | A | * | 10/1988 | Kita et al. .................. 475/76 |
| 4,868,753 | A | * | 9/1989 | Mori ............................ 701/66 |
| 5,593,012 | A | * | 1/1997 | Aho ............................ 192/56.1 |
| 5,890,992 | A | * | 4/1999 | Salecker et al. ................. 477/86 |
| 7,097,264 | B2 | | 8/2006 | Saito et al. |
| 7,596,342 | B2 | * | 9/2009 | Yasumoto .................... 399/167 |
| 8,747,276 | B2 | * | 6/2014 | Shimizu et al. ............... 475/339 |
| 8,805,243 | B2 | * | 8/2014 | Fujiwara et al. .............. 399/167 |
| 8,861,997 | B2 | * | 10/2014 | Maeda ............................ 399/36 |
| 2004/0041854 | A1 | | 3/2004 | Saito et al. |
| 2004/0126149 | A1 | | 7/2004 | Saito et al. |
| 2014/0056618 | A1 | * | 2/2014 | Matsuda et al. ............... 399/167 |
| 2014/0312563 | A1 | * | 10/2014 | Kasamai et al. ............... 271/272 |

FOREIGN PATENT DOCUMENTS

| | | |
|---|---|---|
| JP | 06-034027 A | 2/1994 |
| JP | H0675443 A | 3/1994 |
| JP | 2004-090267 A | 3/2004 |
| JP | 2005-025102 A | 1/2005 |
| JP | 2006-194980 A | 7/2006 |

* cited by examiner

ROTATING MECHANISM DRIVING APPARATUS, IMAGE FORMING APPARATUS, NON-TRANSITORY READABLE MEDIUM IN WHICH COMPUTER PROGRAM FOR EXECUTING METHOD FOR DRIVING THE ROTATING MECHANISM IS RECORDED, ROTATING MECHANISM DRIVING SYSTEM AND IMAGE FORMING SYSTEM

BACKGROUND OF THE INVENTION

1. Field of the Invention

The present invention generally relates to a rotating mechanism driving apparatus, an image forming apparatus, a non-transitory readable medium in which a computer program for executing a method for driving the rotating mechanism is recorded, a rotating mechanism driving system and an image forming system.

2. Description of the Related Art

Conventionally, there has been a technique for controlling a frictional transmission by monitoring a load torque of the frictional transmission based on a slip amount between an input shaft and an output shaft. The slip amount is obtained from the number of rotations of the input shaft and the number of rotations of the output shaft. If the load torque becomes overloaded, the frictional transmission cuts off a power transmission from the input shaft to the output shaft in order to protect a system including the frictional transmission (for example, Japanese Patent Laid-Open Publication No. 06-034027).

However, according to the conventional technique, it is difficult to determine whether a variation of the slip amount is caused by an abnormal state of the frictional transmission or an abnormal state of a rotating mechanism driven by the frictional transmission.

In a case where the variation of the slip amount occurs as described above, it is convenient and useful if it is possible to determine whether the abnormal state has occurred in the frictional transmission or the rotating mechanism.

SUMMARY OF THE INVENTION

It is a general object of the present invention to provide a rotating mechanism driving apparatus, an image forming apparatus, a non-transitory readable medium in which a computer program for executing a method for driving the rotating mechanism is recorded, a rotating mechanism driving system and an image forming system that can determine whether the abnormal state has occurred in the frictional transmission or the rotating mechanism.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a rotating mechanism driving apparatus, an image forming apparatus, a non-transitory readable medium in which a computer program for executing a method for driving the rotating mechanism is recorded, a rotating mechanism driving system and an image forming system particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a rotating mechanism driving apparatus including a motor, a frictional transmission configured to output torque via a viscous fluid, the torque being input from the motor, an input shaft rotational amount detecting part configured to detect a rotational amount of an input shaft of the frictional transmission, an output shaft rotational amount detecting part configured to detect a rotational amount of an output shaft of the frictional transmission, an input torque detecting part configured to detect input torque of the frictional transmission, a slip amount calculating part configured to calculate a slip amount of the output shaft with regard to the input shaft based on difference between the rotational amount of the input shaft and the rotational amount of the output shaft, a first abnormal state determining part configured to determine occurrence of an abnormal state of a rotating mechanism connected to the output shaft of the frictional transmission by comparing the input torque with a reference torque, and a second abnormal state determining part configured to determine occurrence of an abnormal state of the frictional transmission by comparing the slip amount with a reference slip amount.

Other objects, features and advantages of the embodiments of the present invention will become more apparent from the following detailed description when read in conjunction with the accompanying drawings.

DESCRIPTION OF THE PREFERRED EMBODIMENTS

A description is given, with reference to the accompanying drawings, of embodiments of a rotating mechanism driving apparatus, an image forming apparatus, a non-transitory readable medium in which a computer program for executing a method for driving a rotating mechanism is recorded, a rotating mechanism driving system and an image forming system.

First Embodiment

Figure 1:
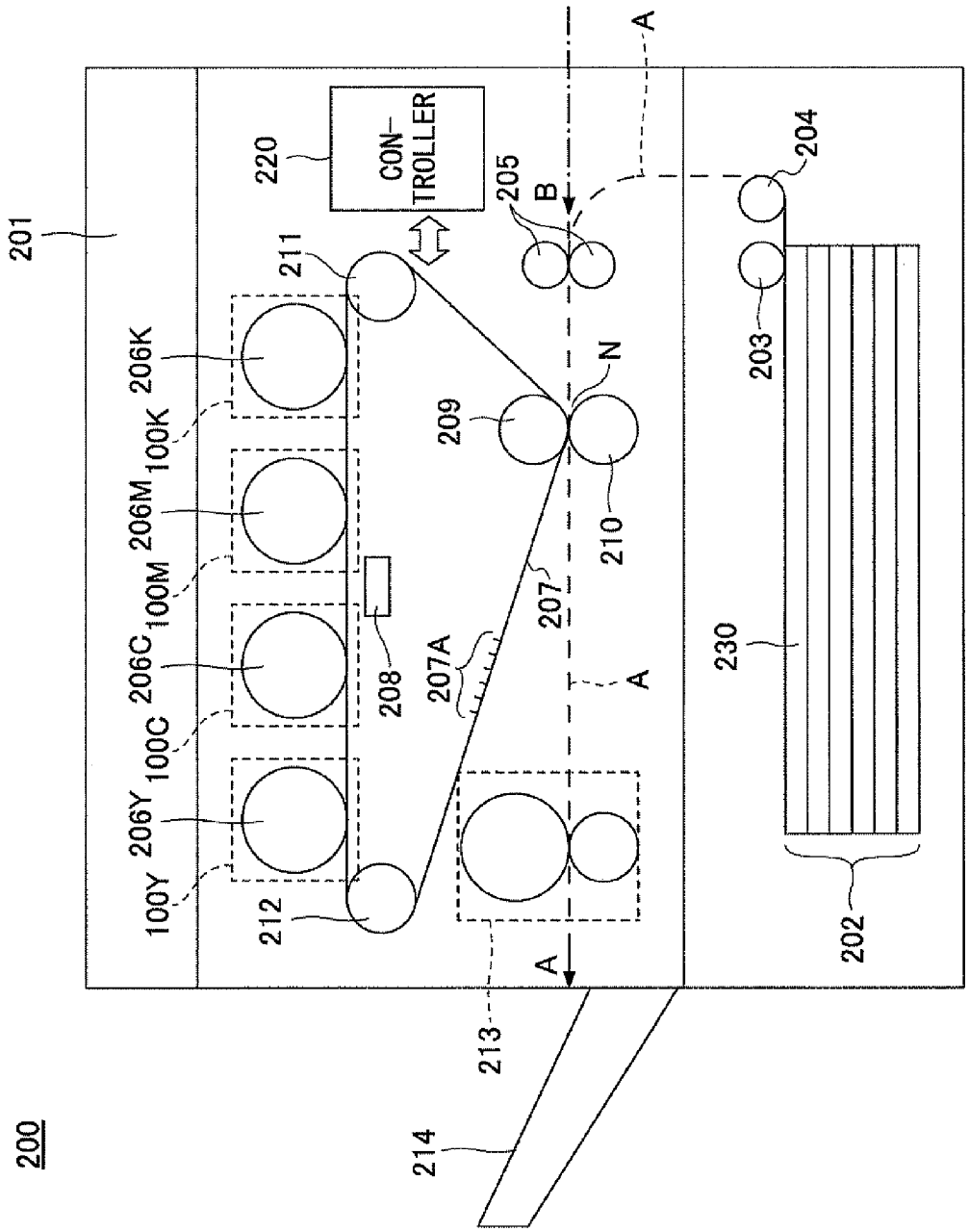
FIG. 1 is a diagram illustrating an image forming apparatus which includes rotating mechanism driving apparatuses of a first embodiment.

FIG. 1 is a diagram illustrating an image forming apparatus 200 which includes rotating mechanism driving apparatuses 100Y to 100K of the first embodiment.

As illustrated in FIG. 1, the image forming apparatus 200 includes a scanner unit 201, a paper feeding unit 202, a paper feeding roller 203, a paper feeding roller 204, a resist roller 205, photoconductor drums 206Y, 206C, 206M and 206K, an intermediate transfer belt 207, an intermediate transfer scale detector 208, a repulsive roller 209, a secondary transfer roller 210, a driving roller 211, a driven roller 212, a fuser unit 213, a paper ejection unit 214, a controller 220 and the rotating mechanism driving apparatuses 100Y, 100C, 100M and 100K.

The image forming apparatus 200 is one example of a color image forming apparatus which forms color images.

The scanner unit 201 is a type of an electronic scanning device which radiates a light which is output from a built-in light source and scans an image in a bitwise manner, for example. The scanner unit 201 transmits data representing the image to the controller 220, and the controller 220 forms image data by processing the data received from the scanner unit 201.

The paper feeding unit 202 is a type of a unit which holds transfer papers. The transfer papers 230 are placed and piled in the paper feeding unit 202.

The paper feeding roller 203 is a type of a roller which feeds the transfer papers 230 piled in the paper feeding unit 202 one by one from the top. The transfer paper 230 fed from the paper feeding unit 202 by the paper feeding roller 203 is sent to the paper feeding roller 204.

The paper feeding roller 204 feeds the transfer paper 230 from the paper feeding roller 203 to the resist roller 205.

The resist roller 205 performs skew correction of the transfer paper 230 and feeds the transfer paper 230 to a nip portion N.

A dashed arrow A indicates a trajectory of the transfer paper 230 from the paper feeding unit 202 to the paper ejection unit 214 via the paper feeding roller 203, the paper feeding roller 204, the resist roller 205, the secondary transfer roller 210, the repulsive roller 209 and the fuser unit 213. An alternate long and short dashed arrow B indicates a trajectory of the transfer paper 230 from a manual paper feeder (not shown) to the resist roller 205 in a case where the transfer paper 230 is fed from the manual paper feeder.

The photoconductor drums 206Y, 206C, 206M and 206K are driven by the rotating mechanism driving apparatuses 100Y, 100C, 100M and 100K, respectively. When the rotating mechanism driving apparatuses 100Y, 100C, 100M and 100K are being driven, a command indicating a launch of image forming is input to the rotating mechanism driving apparatuses 100Y, 100C, 100M and 100K and the controller 220 from a high order controller (not shown).

The rotating mechanism driving apparatuses 100Y, 100C, 100M and 100K execute abnormal state determining processes, respectively, by monitoring an abnormal state which may occur in power transmission mechanisms that transmit driving forces (torques) to rotating shafts of the photoconductor drums 206Y, 206C, 206M and 206K, respectively, and an abnormal state which may occur in the photoconductor drums 206Y, 206C, 206M and 206K. The abnormal state determining processes performed by the rotating mechanism driving apparatuses 100Y, 100C, 100M and 100K are described with reference to FIGS. 2 to 10.

As laser beams are radiated from light sources to the photoconductor drums 206Y, 206C, 206M and 206K based on the image data output from the controller 220, the electric potentials of the surfaces of the photoconductor drums 206Y, 206C, 206M and 206K are changed. Then toners are attached on the surfaces and latent images of yellow (Y), cyan (C), magenta (M) and black (K) are formed thereon, respectively.

The intermediate transfer belt 207 is a type of a loop type belt which does not have ends. The intermediate transfer belt 207 is passed through the nip portion N formed between the repulsive roller 209 and the secondary transfer roller 210, and hung around the driving roller 211 and the driven roller 212.

The surface of the intermediate transfer belt 207 contacts with the photoconductor drums 206Y, 206C, 206M and 206K in an interval between the driving roller 211 and the driven roller 212.

The intermediate transfer belt 207 is a type of an endless transferring body which is rotated by the driving roller 211 and transfers developed images that are superimposed to each other by being transferred from the photoconductor drums 206Y, 206C, 206M and 206K, respectively.

Intermediate belt scales 207A are formed on the surface of the intermediate transfer belt 207. The intermediate belt scales are a type of scale marks that include reflectors and non-reflectors disposed alternately at constant intervals along a transfer direction.

The intermediate transfer scale detector 208 is disposed at a position closed to the intermediate transfer belt 207 so that the intermediate transfer scale detector 208 can detect and count the intermediate transfer belt scales 207A.

The intermediate transfer scale detector 208 outputs pulse signals corresponding to the constant intervals of the intermediate transfer belt scales 207A formed on the intermediate transfer belt 207 and detects the rotating speed of the intermediate transfer belt 207.

The repulsive roller 209 is disposed on the upper side of the secondary transfer roller 210 and contacts and rotates with the secondary transfer roller 210 so that a repulsive force is generated between the repulsive roller 209 and the secondary transfer roller 210. The nip portion N which is used for nipping the intermediate transfer belt 207 and the transfer paper 230 is formed between the repulsive roller 209 and the secondary transfer roller 210.

The secondary transfer roller 210 transfers toner images that are transferred on to the surface of the intermediate transfer belt 207 to the transfer paper 230 at the nip portion N.

The driving roller 211 is a type of a roller which is rotationally driven by a drive motor (not shown) and drives the intermediate transfer belt 207.

The driven roller 212 rotates in accordance with the driving roller 211 and guides the intermediate transfer belt 207.

The fuser unit 213 is a type of a fuser device which fixes the toner image transferred on the surface of the transfer paper 230 to the transfer paper 230. The fuser unit 213 includes a heater which is used for heating the transfer paper 230 in order to fix the toner image on the transfer paper 230, for example.

The paper ejection unit 214 holds the transfer papers 230 that are ejected from the fuser unit 213 after the toner images being fixed on the transfer papers 230.

The data representing the image scanned by the scanner unit 201 is transferred to the controller, and the controller 220 forms the image data which is to be formed on the transfer papers 230.

The controller 220 controls the laser beams that are radiated from the light sources to the photoconductor drums 206Y to 206K based on the image data. As a result, the images are developed on the surfaces of the photoconductor drums 206Y to 206K, respectively.

The controller 220 includes a central processing unit (CPU), a read only memory (ROM), a main memory or the like. Functions of the controller 220 are realized by the CPU which reads and executes control programs stored in the ROM, etc. Herein, a portion or all of the functions of the controller 220 may be constituted of hardware, for example. The controller 220 may physically be comprised of plural devices.

Although the controller 220 and the rotating mechanism driving apparatuses 100Y, 100C, 100M and 100K are separated in FIG. 1, CPUs of the controller 220 and the rotating mechanism driving apparatuses 100Y, 100C, 100M and 100K may be merged into a single CPU, for example. In this case, the single CPU may be disposed in any of the rotating mechanism driving apparatuses 100Y, 100C, 100M and 100K, or disposed outside of the rotating mechanism driving apparatuses 100Y, 100C, 100M and 100K, for example.

Next, the rotating mechanism driving apparatuses 100Y, 100C, 100M and 100K are described with reference to FIGS. 2 to 11. Hereinafter, the rotating mechanism driving apparatuses 100Y, 100C, 100M and 100K may be referred to as a rotating mechanism driving apparatus 100 in a case where the rotating mechanism driving apparatuses 100Y, 100C, 100M and 100K may not be distinguished. Similarly, the photoconductor drums 206Y, 206C, 206M and 206K may be referred to as a photoconductor drum 206 in a case where the photoconductor drums 206Y, 206C, 206M and 206K may not be distinguished.

Figure 2:
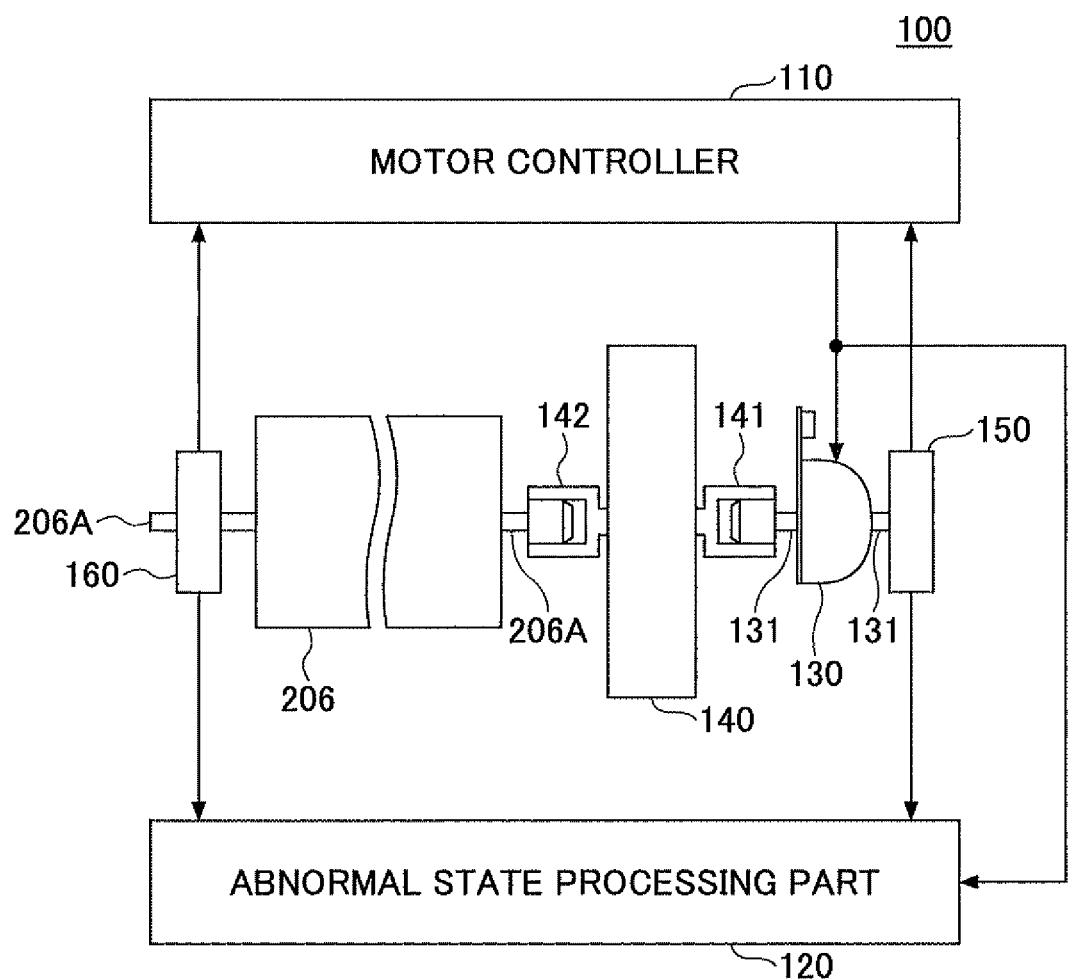
FIG. 2 is a diagram illustrating a rotating mechanism driving apparatus of the first embodiment.

FIG. 2 is a diagram illustrating a rotating mechanism driving apparatus 100 of the first embodiment.

The rotating mechanism driving apparatus 100 includes a motor controller 110, an abnormal state processing part 120, a motor 130, a traction mechanism 140 and encoders 150 and 160. The traction mechanism 140 supplies drive force to the photoconductor drum 206.

The motor controller 110 is a type of a driving controller which performs drive control of the motor 130. A rotation signal of the motor 130 is input to the motor controller 110 from the encoder 150, and a rotation signal of the photoconductor drum 206 is input to the motor controller 110 from the encoder 160.

The motor controller 110 performs a feedback control based on the rotation signals input from the encoders 150 and 160, and generates a control command which is used for controlling rotating speed of the motor 130 at designated speed. The motor controller 110 performs the drive control of the motor 130 by using the control command.

The control command generated by the motor controller 110 is a torque command for controlling torque output from the motor 130, for example. In this case, the control command represents voltage which is applied to the motor 130.

The abnormal state processing part 120 monitors the traction mechanism 140 and the photoconductor drum 206, and determines whether an abnormal state has occurred in the traction mechanism 140 or the photoconductor drum 206.

The rotation signal of the motor 130 is input to the abnormal state processing part 120 from the encoder 150, the rotation signal of the photoconductor drum 206 is input to the motor controller 120 from the encoder 160, and the control command generated by the motor controller 110 is input to the abnormal state processing part 120.

The abnormal state processing part 120 performs an abnormal state determining process based on the rotation signals input from the encoders 150 and 160 and the control command generated by the motor controller 110.

The abnormal state processing part 120 is able to determine whether the abnormal state has occurred in the traction mechanism 140 or the photoconductor drum 206 in a case where the abnormal state has occurred in either of the traction mechanism 140 or the photoconductor drum 206. The reason why this abnormal state determining process is performed will be described later.

The motor 130 is one example of a drive force generating part which generates the drive force that causes the photoconductor drum 206 to rotate. One end (an end as illustrated on the right side in FIG. 2) of a rotating shaft 131 of the motor 130 is connected to the encoder 150, and the other end (an end as illustrated on the left side in FIG. 2) of the rotating shaft 131 is connected to an input shaft 141 of the traction mechanism 140.

A stepping motor may be used as the motor 130. The drive control of the motor 130 is performed by the motor controller 110.

The traction mechanism 140 includes the input shaft 141 and an output shaft 142. The traction mechanism 140 is one example of a frictional transmission which outputs torque which is input to the input shaft 141 from the rotating shaft 131 of the motor 130 to the output shaft 142 via a viscous fluid. The viscous fluid may typically be oil (drive force transfer oil) having designated viscosity.

When the torque is input to the input shaft 141 of the traction mechanism 140, a shear resistance force is generated in the viscous fluid, and the torque is transferred to the output shaft 142 via the viscous fluid.

Therefore, in the traction mechanism 140, the output shaft 142 rotates while slipping to some extent with regard to the rotation of the input shaft 141.

As the traction mechanism 140, a traction mechanism (a traction reducer) manufactured by NIDEC-SHIMPO CORPORATION may be used, for example.

This traction mechanism includes a sun roller, a pair of rings and three planetary rollers. In this traction mechanism, the planetary rollers are located between the rings and rotate around the sun roller. Oil, which is one example of the viscous fluid, is filled between the rings, the planetary rollers and the sun roller.

The input shaft 141 is connected to a rotating shaft of the sun roller, and the output shaft 142 is connected to rotating shafts of the rings. The sun roller and the rings are connected via three planetary rollers and the oil.

Therefore, as the input shaft 141 rotates the sun roller, the planetary rollers are rotated by a shear resistance generated between the sun roller and the planetary rollers. As the planetary rollers rotate, the rings are rotated by a shear resistance generated between the planetary roller and the rings. Rotating forces of the rings are transferred to the output shaft 142.

In the traction mechanism such as this, since the drive forces are transferred via the oil which generates the shear resistance, the rotations of the rings include slips with regard to the rotation of the sun roller. Thus, it is possible to realize smooth rotation without variation of angular speed, low noise, low vibration and no backlash of the output shaft 142.

Herein, since the input shaft 141 of the traction mechanism 140 is directly connected to the rotating shaft 131 of the motor 130 without a reducer or the like, rotational amount of the input shaft 141 of the traction mechanism 140 is equal to rotational amount of the rotating shaft 131 of the motor 130. Further, the torque input to the input shaft 141 of the traction mechanism 140 is equal to the torque generated at the rotating shaft 131 of the motor 130.

Herein, since the input shaft 142 of the traction mechanism 140 is directly connected to a rotating shaft 206A of the photoconductor drum 206 without a reducer or the like, rotational amount of the input shaft 142 of the traction mechanism 140 is equal to rotational amount of the rotating shaft 206A of the photoconductor drum 206.

Although, the traction mechanism 140 is used as the frictional transmission which transfers the drive force of the motor 130 to the photoconductor drum 206 that is one example of the rotating mechanism, a viscous coupling device, a torque converter or a fluid clutch (fluid coupling) may used as the frictional transmission, for example.

The encoder 150 is connected to the rotating shaft 131 of the motor 130, and is one example of a rotation detector which outputs a signal (rotation signal) in accordance with the rotation of the rotating shaft 131.

The rotation signal output from the encoder 150 is input to the motor controller 110 and the abnormal state processing part 120.

A rotary encoder which outputs a pulse signal in every designated rotational angle of the rotating shaft may be used as the encoder 150, for example. The rotation signal is output from the encoder 150 in every designated angle of the rotating shaft of the encoder 150.

The encoder 160 is connected to the rotating shaft 206A of the photoconductor drum 206, and is one example of a rotation detector which outputs a signal (rotation signal) in accordance with the rotation of the rotating shaft 206A.

Since the rotational amount of the rotating shaft 206A of the photoconductor drum 206 is equal to rotational amount of the output shaft 142 of the traction mechanism 140, the rotation signal output from the encoder 160 represents the rotational amount of the rotating shaft 206A of the photoconductor drum 206 and the rotational amount of the output shaft 142 of the traction mechanism 140.

The rotation signal output from the encoder 160 is input to the motor controller 110 and the abnormal state processing part 120.

A rotary encoder which outputs a pulse signal in every designated rotational angle of the rotating shaft may be used as the encoder 160, for example. The rotation signal is output from the encoder 160 in every designated angle of the rotating shaft of the encoder 160.

Next, the abnormal state processing part 120 of the rotating mechanism driving apparatus 100 of the first embodiment is described with reference to FIG. 3.

Figure 3:
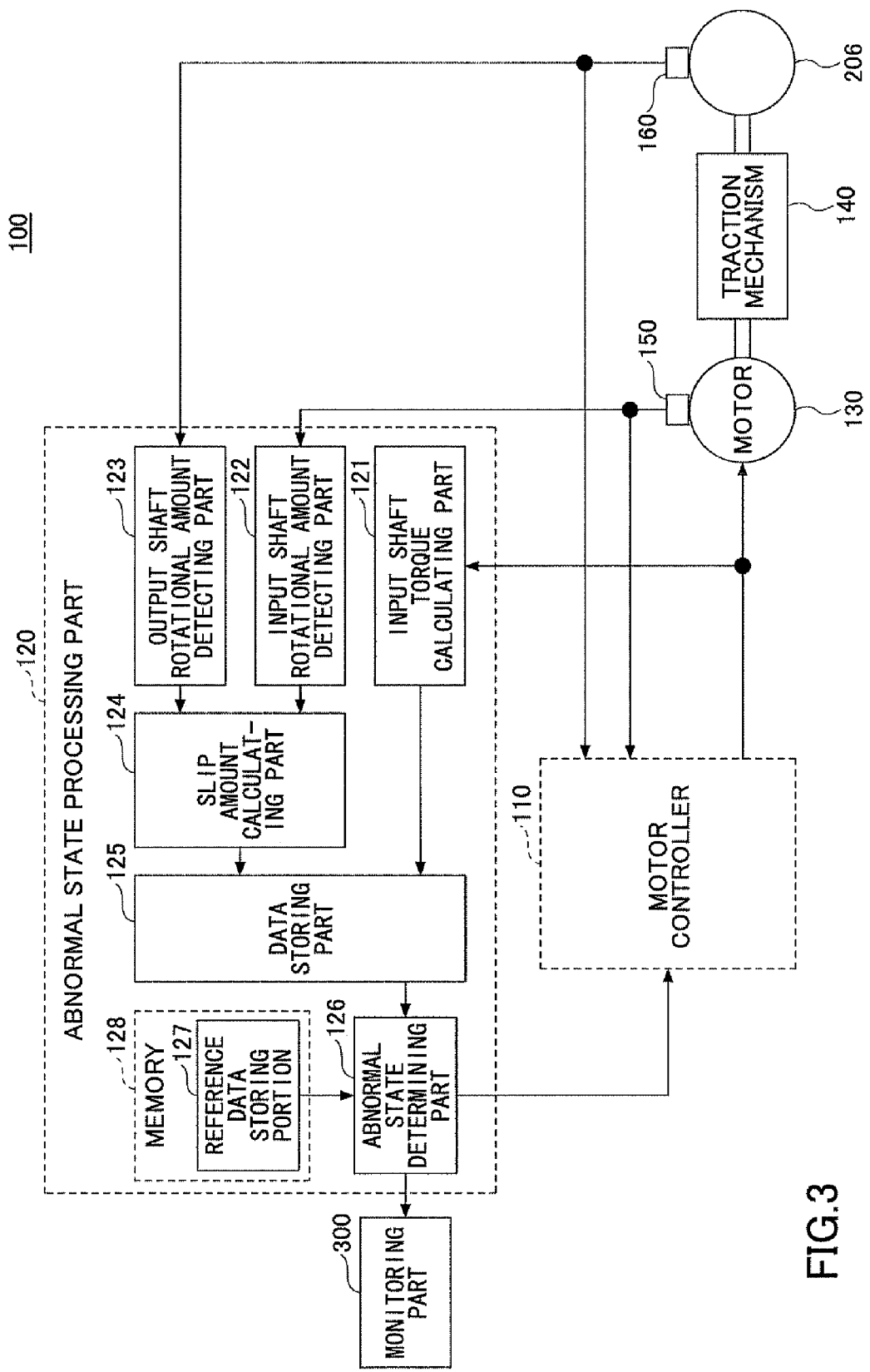
FIG. 3 is a block diagram illustrating the rotating mechanism driving apparatus of the first embodiment.

FIG. 3 is a block diagram illustrating a rotating mechanism driving apparatus 100 of the first embodiment.

In FIG. 3, similar to FIG. 2, the motor controller 110, the abnormal state processing part 120, the motor 130, the traction mechanism 140 and the encoders 150 and 160 that are included in the rotating mechanism driving apparatus 100 are shown.

The abnormal state processing part 120 includes an input shaft torque calculating part 121, an input shaft rotational amount detecting part 122, an output shaft rotational amount detecting part 123, a slip amount calculating part 124, a data storing part 125, an abnormal state determining part 126, a reference data storing portion 127 and a memory 128. A monitoring part 300 is connected to the abnormal state processing part 120.

The abnormal state processing part 120 is one example of an abnormal state determining apparatus which monitors the photoconductor drum 206 and the traction mechanism 140, and determines whether an abnormal state has occurred in the photoconductor drum 206 or the traction mechanism 140.

Within the abnormal state processing part 120, the input shaft torque calculating part 121, the input shaft rotational amount detecting part 122, the output shaft rotational amount detecting part 123, the slip amount calculating part 124, the data storing part 125 and the abnormal state determining part 126 are illustrated as functional blocks that are realized in the CPU by execution of the computer program for executing the method for driving the rotating mechanism, for example.

Similarly, the motor controller 110 is illustrated as a functional block which is realized in the CPU by execution of the computer program for executing the method for driving the rotating mechanism, for example.

The monitoring part 300 is illustrated as a functional block which is realized in the CPU by execution of a designated computer program for monitoring, for example.

In this case, the functional blocks of the input shaft torque calculating part 121, the input shaft rotational amount detecting part 122, the output shaft rotational amount detecting part 123, the slip amount calculating part 124, the data storing part 125 and the abnormal state determining part 126, the motor controller 110 and the monitoring part 300 may be realized in the same CPU.

Further, a portion of the controller 220 (see FIG. 1) which is realized in the CPU may be realized in the same CPU as the CPU as described above.

The input shaft torque calculating part 121 calculates a torque input to the input shaft 141 of the traction mechanism 140 (hereinafter referred to as an input shaft torque of the traction mechanism 140) based on voltage of the control command generated by the motor controller 110.

The input shaft torque of the traction mechanism 140 is equal to a torque input to the rotating shaft of the motor 130. A signal which represents the input shaft torque calculated by the input shaft torque calculating part 121 is input to the data storing part 125.

Calculation of the input shaft torque which is performed by the input shaft torque calculating part 121 based on the voltage of the control command of the motor controller 110 is synonymous with detection of the input shaft torque of the traction mechanism 140. Therefore, the input shaft torque calculating part 121 is one example of an input torque detecting part.

The input shaft torque calculating part 121 may detect the input shaft torque by using a torque detector or torque sensor instead of calculating the input shaft torque based on the voltage of the control command of the motor controller 110.

The input shaft rotational amount detecting part 122 detects the rotational amount of the input shaft 141 of the traction mechanism 140 by calculating variation amount per unit of time of the rotation signal output from the encoder 150. A signal representing the rotational amount of the input shaft 141 detected by the input shaft rotational amount detecting part 122 is input to the slip amount calculating part 124.

The output shaft rotational amount detecting part 123 detects the rotational amount of the output shaft 142 of the traction mechanism 140 by calculating variation amount per unit of time of the rotation signal output from the encoder 160. A signal representing the rotational amount of the output shaft 142 detected by the output shaft rotational amount detecting part 123 is input to the slip amount calculating part 124.

The slip amount calculating part 124 calculates the slip amount of the traction mechanism 140 which represents difference between the rotational amount of the input shaft 141 of the traction mechanism 140 and the rotational amount of the output shaft 142 of the traction mechanism 140. The rotational amount of the input shaft 141 is detected by the input shaft rotational amount detecting part 122, and the rotational amount of the output shaft 142 is detected by the output shaft rotational amount detecting part 123. A signal which represents the slip amount calculated by the slip amount calculating part 124 is input to the data storing part 125.

As described above, since the rotational amount of the rotating shaft 131 of the motor 130 is equal to the rotational amount of the input shaft 141 of the traction mechanism 140, the rotation signal output from the encoder 150 represents the rotational amount of the rotating shaft 131 of the motor 130 and the rotational amount of the input shaft 141 of the traction mechanism 140.

The data storing part 125 temporarily stores the signal representing the input shaft torque detected by the input shaft torque calculating part 121 and the signal representing the slip amount calculated by the slip amount calculating part 124. The data storing part 125 may be a register or an internal memory of the CPU, for example.

The signals that represent the input shaft torque and the slip amount and are stored in the data storing part 125 are read by the abnormal state determining part 126.

Although the data storing part 125 is a part of the CPU as described above, the data storing part 125 may be included in the memory 128.

The abnormal state determining part 126 reads the signal representing the input shaft torque and the signal representing the slip amount from the data storing part 125 and determines occurrence of the abnormal states of the traction mechanism 140 and the photoconductor drum 206.

The abnormal state determining part 126 can distinguish the abnormal state occurred in the traction mechanism 140 and the abnormal state occurred in the photoconductor drum 206 by a method as described hereinafter. The abnormal state determining part 126 is one example of a first abnormal state determining part which determines whether the abnormal state has occurred in the traction mechanism 140, and at the same time is one example of a second abnormal state determining part which determines whether the abnormal state has occurred in the photoconductor drum 206.

The reference data storing portion 127 is a portion of the memory 128 and stores data representing criteria for determination used by the abnormal state determining part 126 in the abnormal state determining processes.

The reference data storing portion 127 stores data representing a reference torque which is used as a criterion for determination of the input shaft torque, and data representing a reference slip amount which is used as a criterion for determination of the slip amount.

Since the slip amount of the traction mechanism 140 increases with increased amount of the input shaft torque, the reference slip amount has characteristics in which the reference slip amount increases with increased amount of the input shaft torque.

The characteristics of the reference slip amount are obtained by adding a designated slip amount to characteristics of a standard slip amount of the traction mechanism 140.

The memory 128 stores the computer program for executing the method for driving the rotating mechanism. A random access memory (RAM) may be used as the memory 128.

The monitoring part 300 transmits a signal indicating the occurrence of the abnormal state to the high order controller which monitors the whole system of the image forming apparatus 200 including the rotating mechanism driving apparatus 100, for example, when the abnormal state determining part 126 determines that the abnormal state has occurred in the traction mechanism 140 or the photoconductor drum 206. As a result, the high order controller stops the operation of the image forming apparatus 200 including the rotating mechanism driving apparatus 100, for example.

In the following, the abnormal state determining process performed by the abnormal state processing part 120 will be described by referring to FIG. 4 through FIG. 10.

Figure 4:
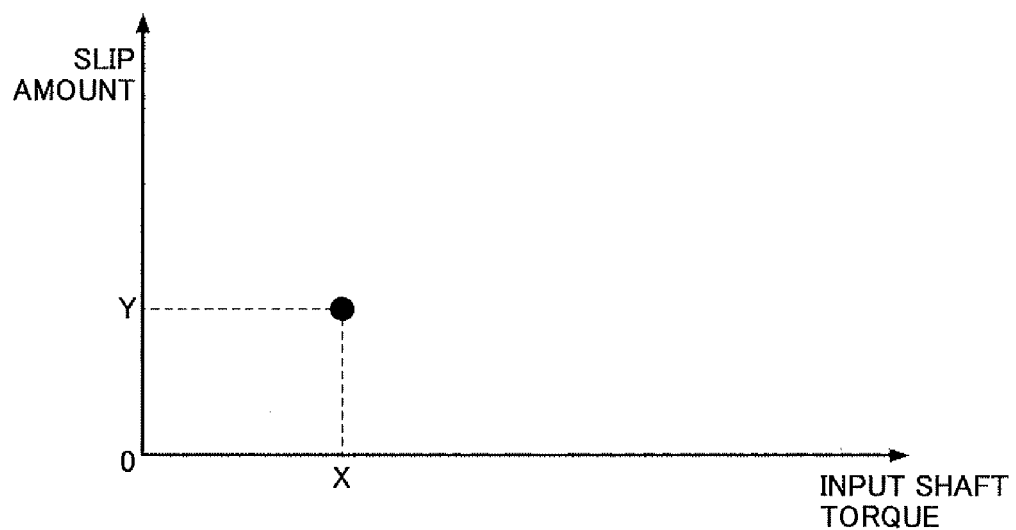
FIG. 4 is a diagram of a coordinate system used by an abnormal state determining part in an abnormal state determining process.

FIG. 4 is a diagram of a coordinate system used by the abnormal state determining part 126 of the abnormal state processing part 120 of the rotating mechanism driving apparatus 100 in the abnormal state determining process.

In the coordinate system as illustrated in FIG. 4, the horizontal axis indicates the input shaft torque and the vertical axis indicates the slip amount. The arrow in the horizontal axis indicates the positive direction of the input shaft torque, and the arrow in the vertical axis indicates the positive direction of the slip amount.

The abnormal state determining part 126 reads the signals indicating the input shaft torque and the slip amount from the data storing part 125, and determines X-value indicating the input shaft torque in the horizontal axis and Y-value indicating the slip amount based on the signals.

The X-value in the horizontal axis indicates the value calculated by the input shaft torque calculating part 121, and the Y-value in the vertical axis indicates the value calculated by the slip amount calculating part 124.

Figure 5:
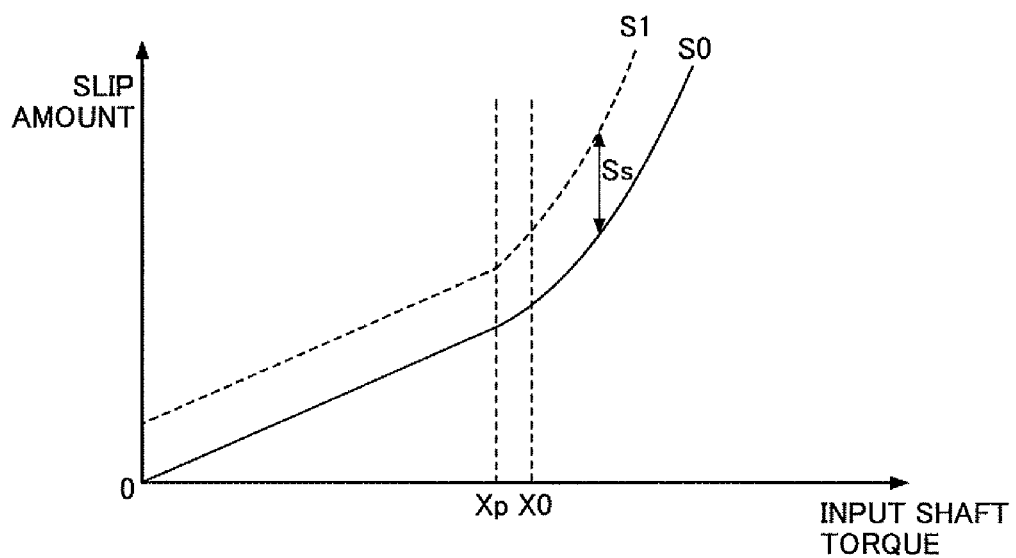
FIG. 5 is a diagram illustrating standard slip amount characteristics and reference slip amount characteristics in the coordinate system.

FIG. 5 is a diagram illustrating standard slip amount characteristics S0 and reference slip amount characteristics S1 in the coordinate system used in the abnormal state determining process. The standard slip amount characteristics S0 and the reference slip amount characteristics S1 are used by the abnormal state determining part 126 of the rotating mechanism driving apparatus 100.

The data representing the reference torque which is used as the criterion for determination of the input shaft torque, and data representing the reference slip amount which is used as the criterion for determination of the slip amount are stored in the reference data storing portion 127.

A reference torque X0 indicates a torque value which is used as the criterion for determining whether the input shaft torque is in a normal state or in the abnormal state. If the input shaft torque is less than or equal to the reference torque X0, the input shaft torque is in the normal state. If the input shaft torque is greater than the reference torque X0, the input shaft torque is in the abnormal state.

Therefore, in FIG. 5, the input shaft torque is in the normal state in the area in which the input shaft torque X is less than or equal to the reference torque X0. The input shaft torque is in the abnormal state in the area in which the input shaft torque X is greater than the reference torque X0.

The reference torque X0 may be determined based on an experimental value or design value of the traction mechanism 140, for example. The reference torque X0 may be set to a value which is obtained by subtracting a designated margin value from the maximum permissible input torque of the traction mechanism 140, for example.

Since the traction mechanism 140 transfers the torque which is input to the input shaft 141 to the output shaft 142 by utilizing the shear resistance of the viscous fluid, the rotational amount of the output shaft 142 includes a certain level of the slip amount with regard to the rotational amount of the input shaft 141.

Hereinafter, a slip amount which occurs in the traction mechanism 140 in a standard condition of the normal state is referred to as a standard slip amount. The standard slip amount is included in the rotational amount of the output shaft 142 of the traction mechanism 140 in the normal state.

Since the slip amount of the traction mechanism 140 has an inclination in which the slip amount increases with increased amount of the input shaft torque, the standard slip amount characteristics S0 has an inclination in which the standard slip amount increases with increased amount of the input shaft torque.

Specifically, as indicated by the standard slip amount characteristics S0 which is represented by a solid line in FIG. 5, the standard slip amount increases linearly with increased amount of the input shaft torque in a state where the input shaft torque is relatively small, and increases in an exponential manner with increased amount of the input shaft torque in a state where the input shaft torque becomes equal to or greater than a certain amount Xp.

The standard slip amount characteristics S0 may be set to characteristics that are detected individually at a factory, average characteristics obtained from the plural traction mechanism 140, or characteristics obtained from experiments. The standard slip amount characteristics S0 may be set in accordance with the size of the photoconductor drum 206 driven by the traction mechanism 140.

The reference slip amount characteristics S1 indicates the reference slip amount of the traction mechanism 140 in accordance with the input shaft torque. The reference slip amount characteristics S1 are obtained by adding a designated permissible slip amount to the standard slip amount characteristics S0 in view of variability and/or secular change, etc., of the traction mechanism 140.

Since the reference slip amount characteristics S1 are obtained by adding a designated permissible slip amount Ss to the standard slip amount characteristics S0 regardless of a value of the input shaft torque, the reference slip amount characteristics S1 are represented as characteristics that are obtained by shifting the standard slip amount characteristics S0 in the positive direction of the vertical axis. The permissible slip amount Ss may be increased or decreased in accordance with increase of the input shaft torque. The permissible slip amount Ss indicates difference of the standard slip amount characteristics S0 and the reference slip amount characteristics S1 in the direction of the vertical axis. An experimental value may be used as the permissible slip amount Ss.

Accordingly, if the slip amount of the traction mechanism 140 belongs to the area located equal to and below the level of the reference slip amount characteristics S1, the slip amount of the traction mechanism 140 is in the normal state. On the contrary, if the slip amount of the traction mechanism 140 belongs to the area located above the level of the reference slip amount characteristics S1, the slip amount of the traction mechanism 140 is in the abnormal state.

Herein, a situation in which the slip amount falls below the standard slip amount characteristics S0 may not occur under normal conditions. Thus, a determination whether the slip amount is in the normal state or not is performed by determining whether the slip amount is less than or equal to a slip amount defined by the reference slip amount characteristics S1 relative to the input shaft torque or not.

Accordingly, the rotating mechanism driving apparatus 100 of the first embodiment distinguishes the abnormal state of the traction mechanism 140 and the abnormal state of the photoconductor drum 206 by using the reference torque X0 and the reference slip amount characteristics S1 illustrated in FIG. 5.

In the following, the abnormal state determining process performed by the abnormal state determining part 126 of the rotating mechanism driving apparatus 100 is described with reference to FIGS. 6 and 7.

Figure 6:
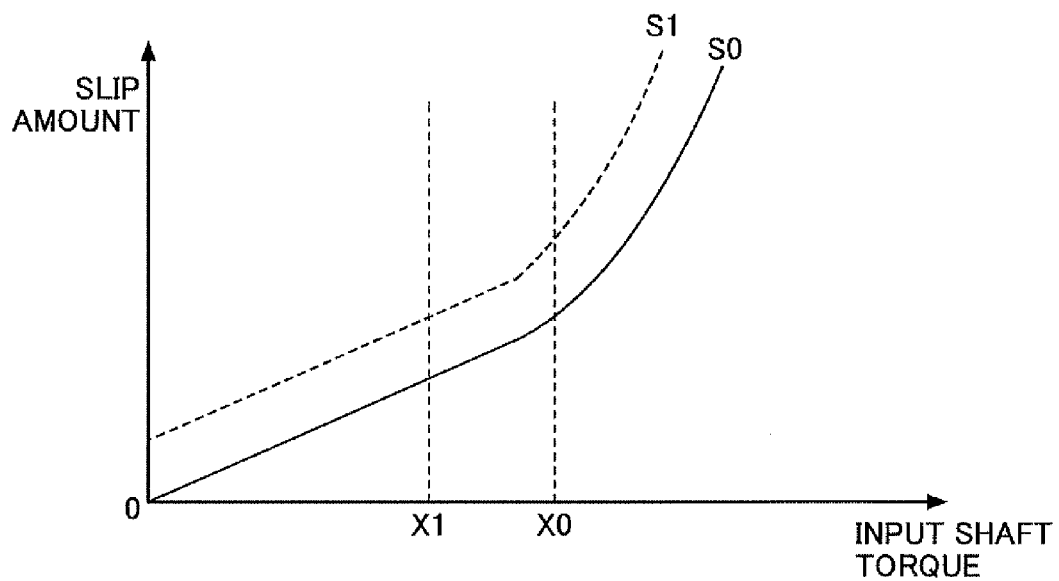
FIG. 6 is a diagram illustrating the coordinate system with a certain input shaft torque.

FIG. 6 is a diagram illustrating the coordinate system with a certain input shaft torque X1.

Figure 7:
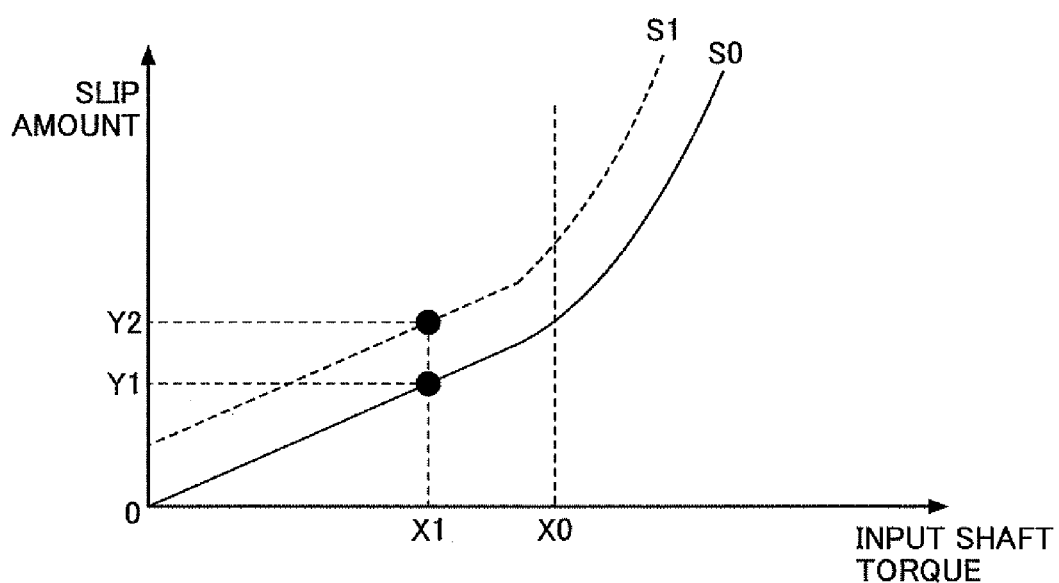
FIG. 7 is a diagram illustrating the coordinate system with a certain slip amount and a certain reference slip amount.

FIG. 7 is a diagram illustrating the coordinate system with a certain slip amount Y1 and a certain reference slip amount Y2 corresponding to the input shaft torque X1.

Herein, the input shaft torque X1 which is calculated by the input shaft torque calculating part 121 is less than the reference torque X0, and the slip amount Y1 is calculated by the slip amount calculating part 124 at a point in time when the abnormal state determining part 126 performs the abnormal state determining process.

Since the current input shaft torque X1 is less than the reference torque X0 as illustrated in FIG. 6, the abnormal state determining part 126 determines that the current input shaft torque of the traction mechanism 140 is in the normal state.

On the contrary, if the current input shaft torque is greater than the reference torque X0, the abnormal state determining part 126 determines that the current input shaft torque of the traction mechanism 140 is in the abnormal state. This case corresponds to a situation in which the photoconductor drum 206 becomes difficult to rotate and thus the motor controller 110 increases output power on the motor 130. Thus, the abnormal state determining part 126 determines that the photoconductor drum 206 is in the abnormal state, if the input shaft torque is in the abnormal state as described above.

If the abnormal state determining part 126 determines that the input shaft torque is in the normal state, the abnormal state determining part 126 compares the current slip amount Y1 with the reference slip amount Y2 corresponding to the input shaft torque X1 on the reference slip amount characteristics S1. Herein, the current slip amount Y1 is less than the reference slip amount Y2.

In a case where the current slip amount is less than or equal to the reference slip amount, such as the case where the current slip amount Y1 is less than the reference slip amount Y2 as illustrated in FIG. 7, for example, the abnormal state determining part 126 determines that the current slip amount of the traction mechanism 140 is in the normal state.

On the contrary, if the current slip amount is greater than the reference slip amount Y2, the abnormal state determining part 126 determines that the current slip amount of the traction mechanism 140 is in the abnormal state. The case in which the input shaft torque is in the normal state and the slip amount is in the abnormal state as described above corresponds to a case where the slip amount becomes abnormally large and a drive torque of the output shaft 142 becomes insufficient, even though the motor 130 outputs appropriate torque to the traction mechanism 140. This case corresponds to the abnormal state such as when breakdown of the traction mechanism 140 has occurred. Thus, the abnormal state determining part 126 determines that the traction mechanism 140 is in the abnormal state, if the input shaft torque is in the normal state and the slip amount is in the abnormal state as described above.

Accordingly, in a case where the input shaft torque and the slip amount are in the normal states respectively, as illustrated in FIG. 7, the traction mechanism 140 and the photoconductor drum 206 are operating in the normal states.

In the following, a case where the traction mechanism 140 or the photoconductor drum 206 is in the abnormal state will be described with reference to FIGS. 8 to 10.

Figure 8:
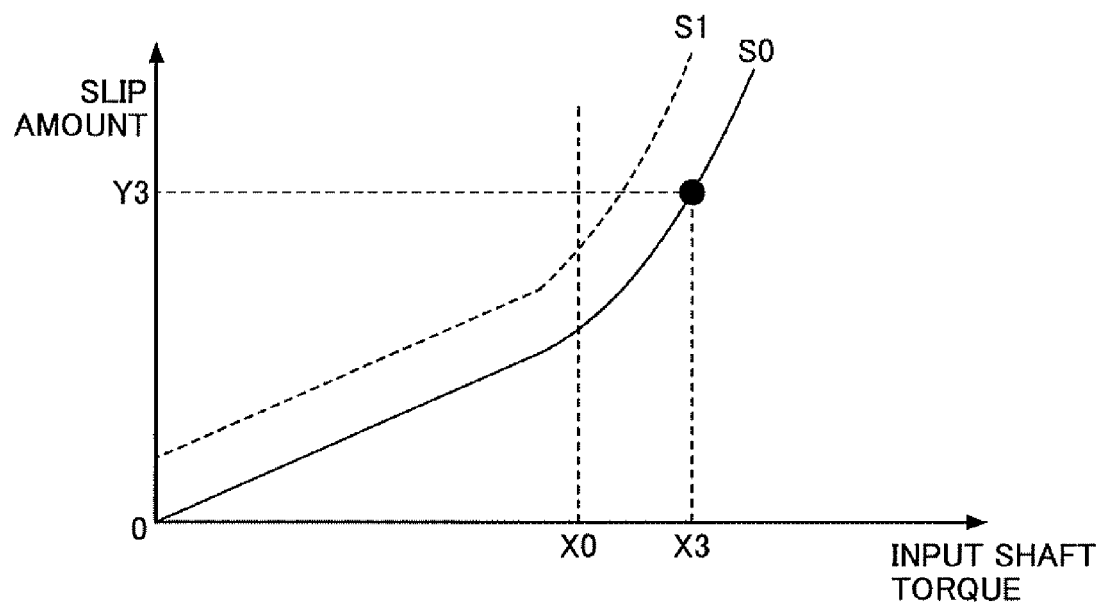
FIG. 8 is a diagram illustrating the coordinate system in a case where a photoconductor drum is in an abnormal state.

FIG. 8 is a diagram illustrating the coordinate system in a case where the photoconductor drum 206 is in the abnormal state.

Herein, an input shaft torque X3 which is calculated by input shaft torque calculating part 121 is greater than the reference torque X0, and a slip amount Y3 is calculated by the slip amount calculating part 124 at a point in time when the abnormal state determining part 126 performs the abnormal state determining process.

Since the current input shaft torque X3 is greater than the reference torque X0, the input shaft torque is in the abnormal state. Thus, the abnormal state determining part 126 determines that the abnormal state has occurred in the photoconductor drum 206.

Further, since the slip amount Y3 is equal to the slip amount (Y3) corresponding to the input shaft torque X3 on the standard slip amount characteristics S0 and is located below the level of the reference slip amount characteristics S1, the slip amount is in the normal state. Thus, the abnormal state determining part 126 determines that the traction mechanism 140 is in the normal state.

As described above, the relationship of the input shaft torque and the slip amount as illustrated in FIG. 8 indicates a state in which the abnormal state of the photoconductor drum 206 has occurred. The abnormal state of the photoconductor drum 206 may occur in a case where the rotating shaft 206A of the photoconductor drum 206 is curved or distorted or in a case where an abnormally large amount of toner is attached to the photoconductor drum 206, for example.

Figure 9:
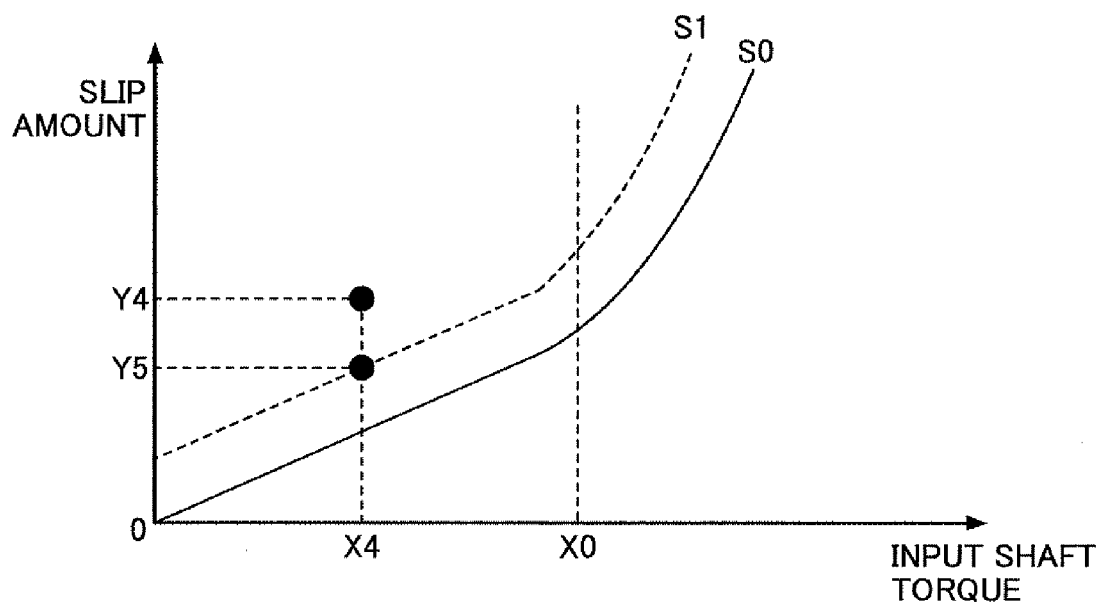
FIG. 9 is a diagram illustrating the coordinate system in a case where a traction mechanism is in an abnormal state.

FIG. 9 is a diagram illustrating the coordinate system in a case where the traction mechanism 140 is in the abnormal state.

Herein, an input shaft torque X4 which is calculated by input shaft torque calculating part 121 is less than the reference torque X0, and a slip amount Y4 which is calculated by the slip amount calculating part 124 is greater than a slip amount Y5 at a point in time when the abnormal state determining part 126 performs the abnormal state determining process.

Since the current input shaft torque X4 is less than the reference torque X0, the input shaft torque is in the normal state. Thus, the abnormal state determining part 126 determines that the photoconductor drum 206 is in the normal state.

Further, since the slip amount Y4 is greater than the slip amount Y5 corresponding to the input shaft torque X4 on the reference slip amount characteristics S1, the slip amount is in the abnormal state. Thus, the abnormal state determining part 126 determines that the traction mechanism 140 is in the abnormal state.

As described above, the relationship of the input shaft torque and the slip amount as illustrated in FIG. 9 indicates a state in which the abnormal state of the traction mechanism 140 has occurred. The abnormal state of the photoconductor drum 206 may occur in a case where the shear resistance of the viscous fluid in the traction mechanism 140 becomes insufficient or in a case where a rotational condition of the input shaft 141 or the output shaft 142 is getting worse.

Figure 10:
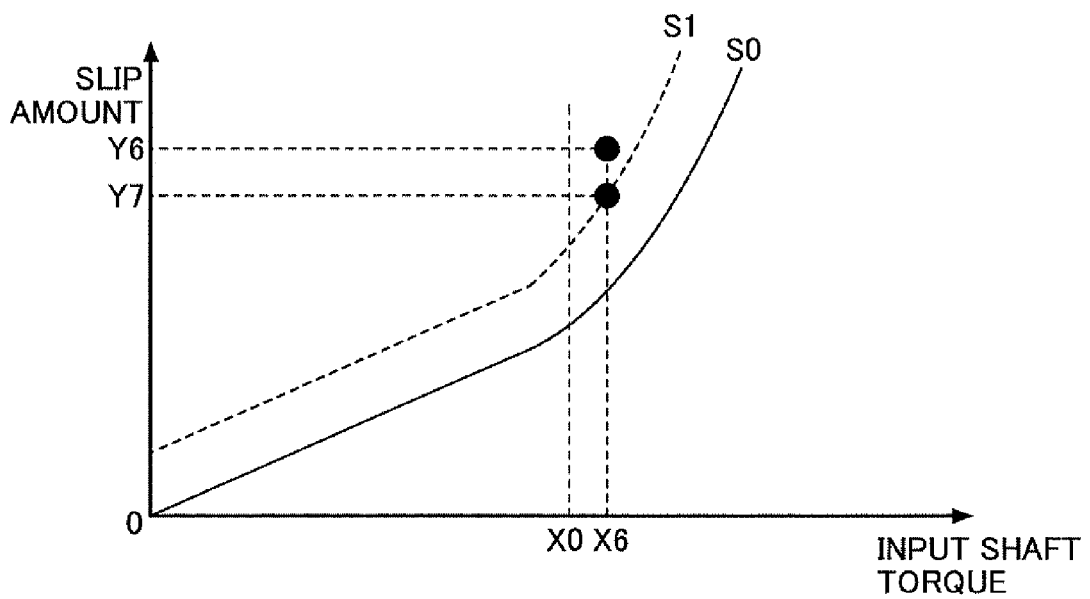
FIG. 10 is a diagram illustrating the coordinate system in a case where the traction mechanism and the photoconductor drum are in the abnormal state.

FIG. 10 is a diagram illustrating the coordinate system in a case where the traction mechanism 140 and the photoconductor drum 206 are in the abnormal state.

Herein, an input shaft torque X6 which is calculated by input shaft torque calculating part 121 is greater than the reference torque X0, and a slip amount Y6 is calculated by the slip amount calculating part 124 is greater than a slip amount Y7 at a point in time when the abnormal state determining part 126 performs the abnormal state determining process.

Since the current input shaft torque X6 is greater than the reference torque X0, the input shaft torque is in the abnormal state. Thus, the abnormal state determining part 126 determines that the abnormal state has occurred in the photoconductor drum 206.

Further, since the slip amount Y6 is greater than the slip amount Y7 corresponding to the input shaft torque X6 on the reference slip amount characteristics S1, the slip amount is in the abnormal state. Thus, the abnormal state determining part 126 determines that the traction mechanism 140 is in the abnormal state.

As described above, the relationship of the input shaft torque and the slip amount as illustrated in FIG. 10 indicates a state in which the abnormal states of the traction mechanism 140 and the photoconductor drum 206 have occurred.

The abnormal states of the traction mechanism 140 and the photoconductor drum 206 may occur in a case where the shear resistance of the viscous fluid in the traction mechanism 140 becomes insufficient or in a case where a rotational condition of the input shaft 141 or the output shaft 142 is getting worse in a condition where the rotating shaft 206A of the photoconductor drum 206 is curved or distorted or in a condition where an abnormally large amount of toner is attached to the photoconductor drum 206, for example.

In the following, procedures of the abnormal state determining process of the abnormal state processing part 120 will be described by referring to FIG. 11.

Figure 11:
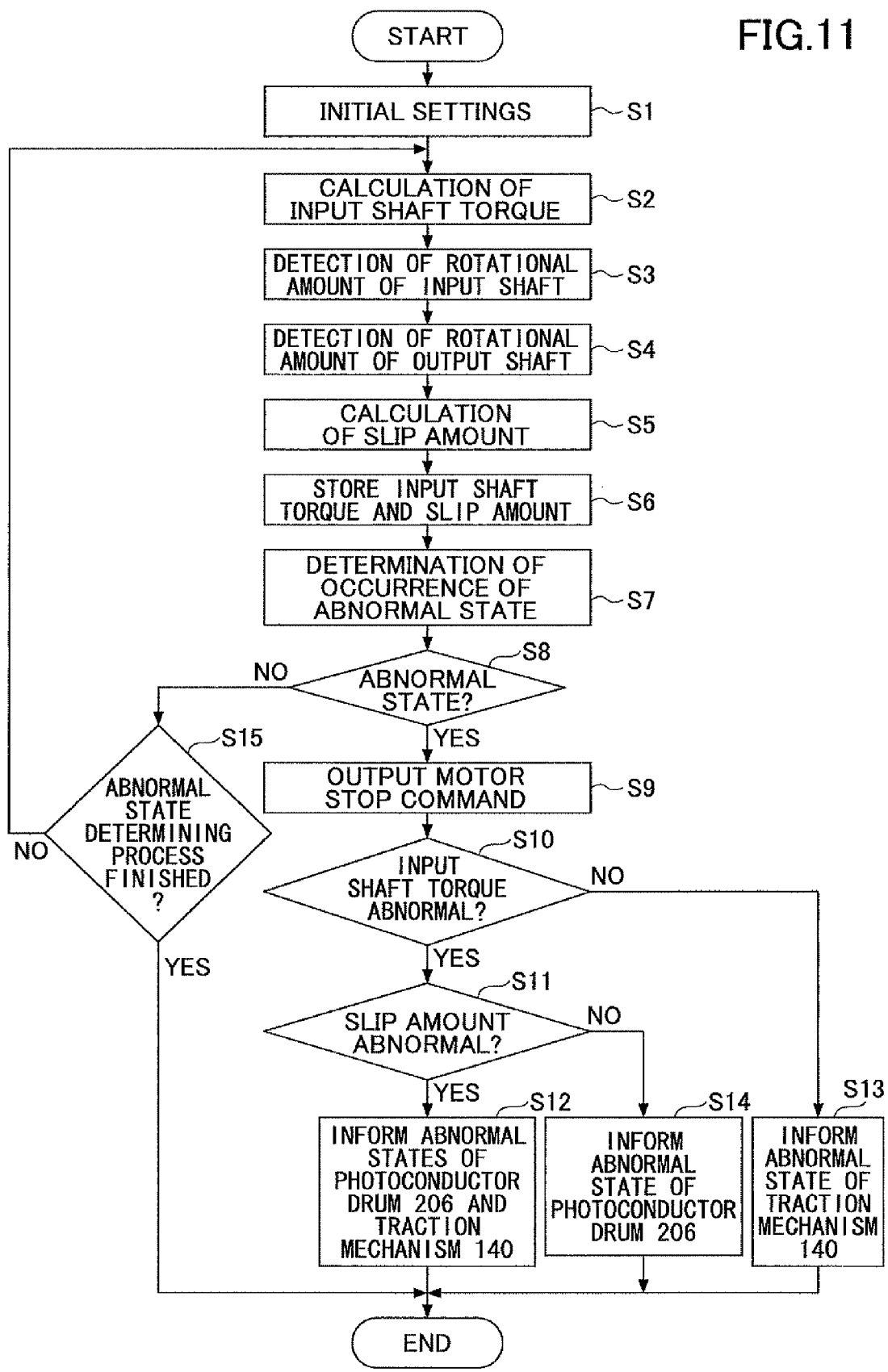
FIG. 11 is a flowchart illustrating procedures of the abnormal state determining process of the abnormal state determining part of the first embodiment.

FIG. 11 is a flowchart illustrating the procedures of the abnormal state determining process of the abnormal state processing part 120 of the rotating mechanism driving apparatus 100 of the first embodiment.

The abnormal state processing part 120 starts the abnormal state determining process when the rotating mechanism driving apparatus 100 enters a power-on state (START).

The abnormal state processing part 120 performs initial settings (step S1). As the initial settings, the abnormal state processing part 120 reads the computer program for executing the method for driving the rotating mechanism from the memory 128 and reads the data representing the reference torque X0 and the reference slip amount characteristics S1 from the reference data storing portion 127, for example.

Next, the abnormal state processing part 120 calculates the input shaft torque based on the voltage of the control command generated by the motor controller 110 (step S2). The procedure of step S2 is performed by the input shaft torque calculating part 121 of the abnormal state processing part 120. The signal which represents the input shaft torque calculated by the input shaft torque calculating part 121 is input to the data storing part 125.

Next, the abnormal state processing part 120 detects the rotational amount of the input shaft 141 of the traction mechanism 140 based on the rotation signal output from the encoder 150 (step S3). The procedure of step S3 is performed by the input shaft rotational amount detecting part 122 of the abnormal state processing part 120. The signal representing the rotational amount of the input shaft 141 detected by the input shaft rotational amount detecting part 122 is input to the slip amount calculating part 124.

Next, the abnormal state processing part 120 detects the rotational amount of the output shaft 142 of the traction mechanism 140 based on the rotation signal output from the encoder 160 (step S4). The procedure of step S4 is performed by the output shaft rotational amount detecting part 123 of the abnormal state processing part 120. The signal representing the rotational amount of the output shaft 142 detected by the output shaft rotational amount detecting part 123 is input to the slip amount calculating part 124.

The abnormal state processing part 120 calculates the slip amount of the traction mechanism 140 which represents the difference between the rotational amount of the input shaft 141 of the traction mechanism 140 and the rotational amount of the output shaft 142 of the traction mechanism 140 (step S5). The rotational amount of the input shaft 141 is detected by the input shaft rotational amount detecting part 122, and the rotational amount of the output shaft 142 is detected by the output shaft rotational amount detecting part 123. The procedure of step S5 is performed by the slip amount calculating part 124 of the abnormal state processing part 120. The signal which represents the slip amount calculated by the slip amount calculating part 124 is input to the data storing part 125.

Next, abnormal state processing part 120 causes the data storing part 125 to temporarily store the data of the signal representing the input shaft torque detected by the input shaft torque calculating part 121 and the data of the signal representing the slip amount calculated by the slip amount calculating part 124 (step S6). The procedure of step S6 is performed by causing the data storing part 125 to store the data of the signals. The abnormal state processing part 120 causes the data storing part 125 to store the data until the end of step S14 as described later.

Next, the abnormal state processing part 120 reads the signals representing the input shaft torque and the slip amount from the data storing part 125 and determines the occurrence of the abnormal states of the traction mechanism 140 and the photoconductor drum 206 (step S7). The procedure of step S7 is executed by the abnormal state determining part 126 of the abnormal state processing part 120 as described above with reference to FIGS. 7 to 10. The abnormal state determining part 126 determines the occurrence of the abnormal states of the traction mechanism 140 and the photoconductor drum 206.

At step S7, firstly, the abnormal state determining part 126 determines the occurrence of the abnormal state of the photoconductor drum 206 based on the input shaft torque, and then determines the occurrence of the abnormal state of the traction mechanism 140 based on the slip amount.

Next, the abnormal state processing part 120 determines whether the abnormal state determining part 126 has determined the occurrence of the abnormal state of the traction mechanism 140 or the photoconductor drum 206 at step S7 or not (step S8). The abnormal state processing part 120 advances the flow to step S9, if the abnormal state determining part 126 has determined the occurrence of the abnormal state of the photoconductor drum 206 or the traction mechanism 140 at step S7.

Next, the abnormal state processing part 120 outputs a motor stop command to the monitoring part 300 (step S9). The motor stop command is a type of a command used for stopping the motor 130. This is because when the abnormal state of the photoconductor drum 206 or the traction mechanism 140 occurs, it is necessary to stop the image forming apparatus 200 including the rotating mechanism driving apparatus 100.

As a result, the monitoring part 300 transmits a signal which represents the occurrence of the abnormal state to the high order controller which monitors the whole system of the image forming apparatus 200 including the rotating mechanism driving apparatus 100. Then the whole operations of the image forming apparatus 200 are stopped by the high order controller.

Next, the abnormal state processing part 120 reads the signal representing the input shaft torque from the data storing part 125, and determines whether the abnormal state of the photoconductor drum 206 has occurred or not by determining whether the input torque is in the normal state or not (step S10). If the abnormal state of the photoconductor drum 206 has occurred, the abnormal state processing part 120 advances the flow to step S11.

Next, the abnormal state processing part 120 reads the signal representing the slip amount from the data storing part 125, and determines whether the abnormal state of the traction mechanism 140 has occurred or not by determining whether the slip amount is in the normal state or not (step S11). If the abnormal state of the traction mechanism 140 has occurred, the abnormal state processing part 120 advances the flow to step S12.

Next, if the abnormal state processing part 120 has determined that the traction mechanism 140 is in the abnormal state at step S11, the abnormal state processing part 120 informs that both the photoconductor drum 206 and the traction mechanism 140 are in the abnormal states (step S12). The relationship of the input shaft torque and the slip amount at this stage corresponds to the relationship as illustrated in FIG. 10.

If the abnormal state processing part 120 has determined that the photoconductor drum 206 is in the normal state at step S10, the abnormal state processing part 120 informs that the traction mechanism 140 is in the abnormal state to the monitoring part 300 (step S13). The relationship of the input shaft torque and the slip amount at this stage corresponds to the relationship as illustrated in FIG. 9.

If the abnormal state processing part 120 has determined that the traction mechanism 140 is in the normal state at step S11, the abnormal state processing part 120 informs that the photoconductor drum 206 is in the abnormal state to the monitoring part 300 (step S14). The relationship of the input shaft torque and the slip amount at this stage corresponds to the relationship as illustrated in FIG. 8.

If the abnormal state processing part 120 has determined that the abnormal state has not occurred at step S8, the abnormal state processing part 120 determines whether to finish the abnormal state determining process or not without informing the abnormal state to the monitoring part 300 (step S15). In this case, the abnormal states of both the photoconductor drum and the traction mechanism 140 have not occurred.

Since the abnormal state determining process is performed repeatedly by the rotating mechanism driving apparatus 100 during the power-on state of the rotating mechanism driving apparatus 100 included in the image forming apparatus 200, the abnormal state processing part 120 determines whether to finish the abnormal state determining process or not by determining whether the power of the image forming apparatus 200 is shut down or not at step S15.

If the abnormal state processing part 120 determines not to finish the abnormal state determining process at step S15, the abnormal state processing part 120 returns the flow to step S2 and executes repeatedly the steps following to step S3.

If the abnormal state processing part 120 determines to finish the abnormal state determining process at step S15, the abnormal state processing part 120 finishes a sequence of the abnormal state determining process (END).

In a case where the abnormal state processing part 120 finishes informing processes to the monitoring part 300 at steps S12, S13 and S14, the abnormal state processing part 120 finishes a sequence of the abnormal state determining process (END). This is because the operation of the image forming apparatus 200 is stopped by the occurrence of the abnormal state occurred in the rotating mechanism driving apparatus 100.

As described above, according to the rotating mechanism driving apparatus 100 of the first embodiment, it becomes possible to distinguish and detect the abnormal states of the photoconductor drum 206 and the traction mechanism 140 by monitoring the input shaft torque and the slip amount.

Since it is possible to identify whether the abnormal state has occurred in the photoconductor drum 206 or the traction mechanism 140, it becomes possible to provide the rotating mechanism driving apparatus 100 and the image forming apparatus 200, including the same, that have enhanced convenience and maintainability (simplified maintenance).

The rotating mechanism driving apparatus 100 includes the traction mechanism 140 as the frictional transmission. The operation of the traction mechanism 140 is very smooth and fluidic compared with a frictional transmission including toothed wheels or gears particularly when speeding up the rotating speed from the stopped state and stopping the rotation from the rotating state. Thus, it becomes possible to drive the photoconductor drum 206 in a highly smooth and fluidic manner.

Therefore, according to the image forming apparatus 200 including the rotating mechanism driving apparatus 100, it becomes possible to develop a high-definition image without pitch unevenness onto the transfer papers 230.

According to the first embodiment, in the rotating mechanism driving apparatus 100 which can drive the photoconductor drum 206 in a smooth and fluidic manner, it becomes possible to distinguish and detect the abnormal states of the photoconductor drum 206 and the traction mechanism 140 by monitoring the input shaft torque and the slip amount. Thus, it becomes possible to provide the rotating mechanism driving apparatus 100 and the image forming apparatus 200 including the same that have enhanced convenience and maintainability (simplified maintenance).

Since the image forming apparatus 200 includes the photoconductor drums 206Y, 206C, 206M and 206K as illustrated in FIG. 1, the image forming apparatus 200 includes the four rotating mechanism driving apparatuses 100Y, 100C, 100M and 100K as illustrated in FIG. 1.

In this case, since the single monitoring part 300 is used in common with the four rotating mechanism driving apparatuses 100Y, 100C, 100M and 100K, the high order controller may stop the operation of the image forming apparatus 200 when the abnormal state of the photoconductor drum 206 or the traction mechanism 140 of either one of the four rotating mechanism driving apparatuses 100Y, 100C, 100M and 100K has occurred.

Although, as described above, the image forming apparatus 200 includes the photoconductor drums 206Y, 206C, 200M and 206K that are driven by the rotating mechanism driving apparatuses 100Y, 100C, 100M and 100K, respectively, the image forming apparatus 100 may include the single photoconductor drum 206 and the single rotating mechanism driving apparatus 100.

Although, the rotating mechanism driving apparatus 100 which includes the traction mechanism 140 as the frictional transmission is described above, the frictional transmission may not be limited to the traction mechanism 140. Other type of frictional transmission may be used instead of the traction mechanism 140 as long as the frictional transmission includes the viscous fluid as a transmitting medium of the torque between the input shaft and the output shaft.

A viscous coupling device, a torque converter or a fluid clutch (fluid coupling) may be used as the frictional transmission, for example.

Although the embodiment in which the rotating mechanism driving apparatus 100 drives the photoconductor drum 206 is described above, the rotating mechanism driving apparatus 100 may drive a rotating body other than the photoconductor drum 206.

The rotating mechanism driving apparatus 100 may drive the paper feeding roller 203, the paper feeding roller 204, the resist roller 205, the secondary transfer roller 210, the driving roller 211, the fuser unit 213 or a roller of the auto document Feeder (ADF), for example.

Second Embodiment

In the second embodiment, a rotating mechanism driving system in which a part of a rotating mechanism driving apparatus is disposed in a server located outside of the rotating mechanism driving apparatus and the rotating mechanism driving apparatus is connected to the server via a network will be described.

Otherwise, the rotating mechanism driving apparatus according to the second embodiment is similar to the rotating mechanism driving apparatus 100 according to the first embodiment. Accordingly, the same elements as or elements similar to those of the rotating mechanism driving apparatus 100 of the first embodiment are referred to by the same reference numerals, and a description thereof is omitted.

Figure 12:
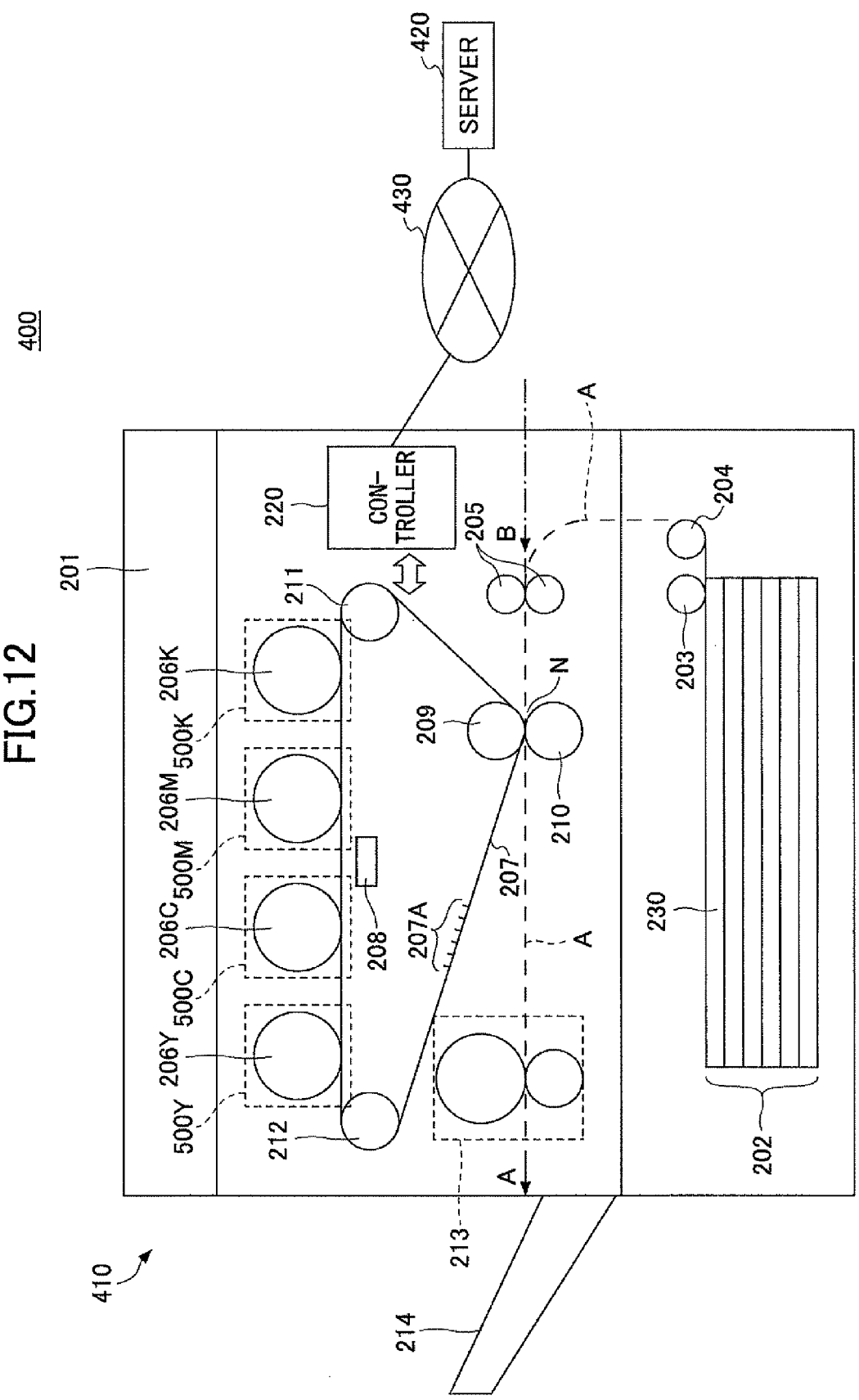
FIG. 12 is a diagram illustrating an image forming system including a rotating mechanism driving system of the second embodiment.

FIG. 12 is a diagram illustrating an image forming system 400 including the rotating mechanism driving system of the second embodiment.

The image forming system 400 includes an image forming apparatus 410 and a server 420. The controller 220 of the image forming apparatus 410 and the server 420 are connected via a network 430. The network 430 may be a Local Area Network (LAN), the internet or the like, for example.

Although, the image forming device 410 and the server 420 is connected via the network 430 as illustrated in FIG. 12, the image forming apparatus 410 and the server 420 may be connected via a dedicated data transfer cable.

The image forming apparatus 410 includes a scanner unit 201, a paper feeding unit 202, a paper feeding roller 203, a paper feeding roller 204, a resist roller 205, photoconductor drums 206Y, 206C, 206M and 206K, an intermediate transfer belt 207 and an intermediate transfer scale detector 208.

The image forming apparatus 410 includes a repulsive roller 209, a secondary transfer roller 210, a driving roller 211, a driven roller 212, a fuser unit 213, a paper ejection unit 214, a controller 220 and rotating mechanism driving apparatuses 500Y, 500C, 500M and 500K.

The rotating mechanism driving apparatuses 500Y, 500C, 500M and 500K are connected to the server 420 via the controller 220 and the network 430. The rotating mechanism driving apparatuses 500Y, 500C, 500M and 500K may be connected to the server 420 via the network 430 without the controller 220.

The rotating mechanism driving system of the second embodiment is comprised of the controller 220, the server 420 and the rotating mechanism driving apparatuses 500Y, 500C, 500M and 500K among the image forming system 400.

A configuration of the rotating mechanism driving system of the second embodiment will be described later.

Figure 13:
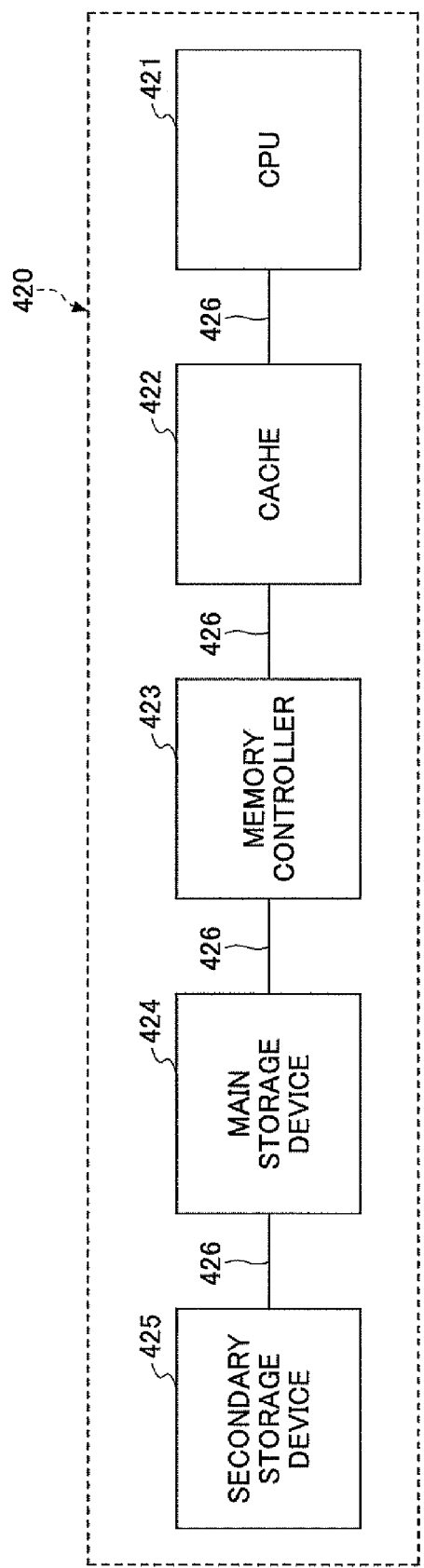
FIG. 13 is a diagram illustrating a configuration of a server included in the rotating mechanism driving system and the image forming system of the second embodiment.

FIG. 13 is a diagram illustrating a configuration of the server 420 included in the rotating mechanism driving system and the image forming system 400 of the second embodiment.

The server 420 is a type of an information processing apparatus which includes a central processing unit (CPU) 421, a cache 422, a memory controller 423, a main storage device 424 and a secondary storage device 425. The CPU 421, the cache 422, the memory controller 423, the main storage device 424 and the secondary storage device 425 are connected to each other via dedicated system buses 426, for example. Herein, the server 420 may include the plural CPUs 421.

The cache 422 is a type of a memory which temporarily stores data which is used by the CPU 421 when the CPU 421 performs processing. A random access memory (RAM) may be used as the cache 422.

The memory controller 423 is a type of a controller which performs control of data which is read and written between the cache 422 and the main storage device 424 based on a command output from the CPU 421.

The CPU 421, the cache 422 and the memory controller 423 may be realized by a large scale integration circuit (LSI), for example.

A read only memory (ROM) or a dynamic random access memory (DRAM) may be used as the main storage device 424, for example. A hard disk may be used as the secondary storage device 425, for example.

Herein, the server 420 may include a data input/output port or the like which is used for communicating with an external apparatus.

Next, the rotating mechanism driving system of the second embodiment will be described with reference to FIG. 14. Since the rotating mechanism driving apparatuses 500Y, 500C, 500M and 500K have the same configuration, hereinafter the rotating mechanism driving apparatuses 500Y, 500C, 500M and 500K may be referred to as a rotating mechanism driving apparatus 500 in a case where the rotating mechanism driving apparatuses 500Y, 500C, 500M and 500K may not be distinguished.

Hereinafter, the photoconductor drums 206Y, 206C, 206M and 206K may be referred to as the photoconductor drum 206 in a case where the photoconductor drums 206Y, 206C, 206M and 206K may not be distinguished.

Figure 14:
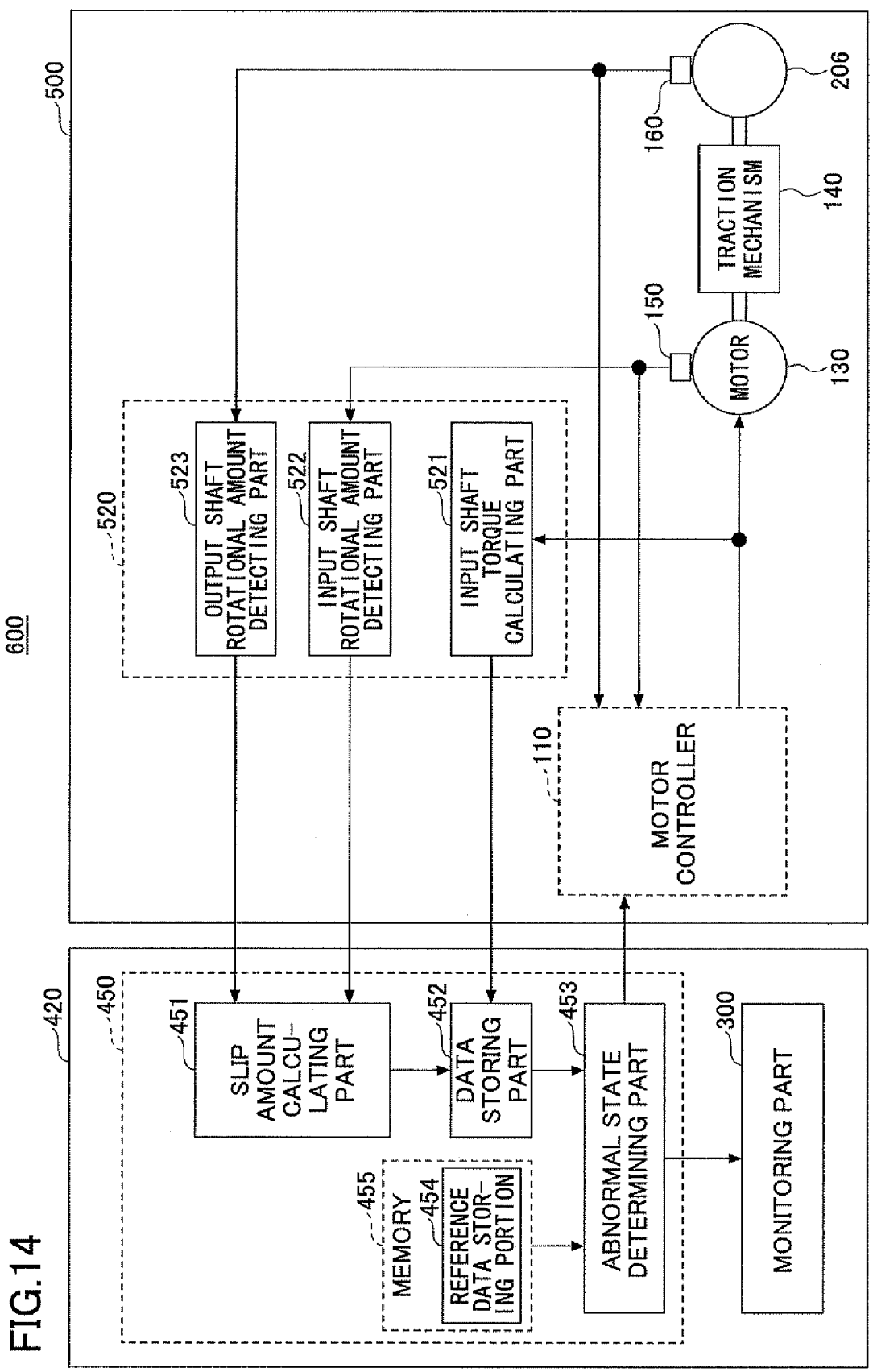
FIG. 14 is a diagram illustrating a rotating mechanism driving system of the second embodiment.

FIG. 14 is a diagram illustrating the rotating mechanism driving system 600 of the second embodiment.

The rotating mechanism driving system 600 includes the server 420 and the rotating mechanism driving apparatus 500. Although the rotating mechanism driving system 600 includes the controller 220 (see FIG. 12), the controller 220 is omitted in FIG. 14.

Although the controller 220 is omitted in FIG. 14, the rotating mechanism driving apparatus 500 and server 420 are connected via the controller 220 and the network 430 (see FIG. 12). Herein, in a case where the CPU of the controller 220 and the CPU of the rotating mechanism driving apparatus 500 are commonalized as a single CPU, the rotating mechanism driving apparatus 500 is connected to the server 420 via the network 430.

Although the photoconductor drum 206 is illustrated in the rotating mechanism driving apparatus 500 in FIG. 14 for the purpose of understandability, the photoconductor drum 206 is an element included in the image forming apparatus 410 and is not an element included in the rotating mechanism driving apparatus 500.

As illustrated in FIG. 14, the rotating mechanism driving apparatus 500 includes a motor controller 110, an abnormal state processing part 520, a motor 130, a traction mechanism 140 and encoders 150 and 160. The abnormal state processing part 520 includes an input shaft torque calculating part 521, an input shaft rotational amount detecting part 522 and an output shaft rotational amount detecting part 523.

The server 420 includes an abnormal state processing part 450 and the monitoring part 300. The abnormal state processing part 450 includes a slip amount calculating part 451, a data storing part 452, an abnormal state determining part 453, a reference data storing portion 454 and a memory 455.

Herein, the input shaft torque calculating part 521, the input shaft rotational amount detecting part 522 and the output shaft rotational amount detecting part 523 of the abnormal state processing part 520 correspond to the input shaft torque calculating part 121, the input shaft rotational amount detecting part 122 and the output shaft rotational amount detecting part 123 of the abnormal state processing part 120 of the rotating mechanism driving apparatus 100 according to the first embodiment, respectively.

The slip amount calculating part 451, the data storing part 452, the abnormal state determining part 453, the reference data storing portion 454 and the memory 455 included in the abnormal state processing part 450 of the server 420 correspond to the slip amount calculating part 124, the data storing part 125, the abnormal state determining part 126, the reference data storing portion 127 and the memory 128 included in the abnormal state processing part 120 of the rotating mechanism driving apparatus 100 according to the first embodiment, respectively.

The relation of the connection of the input shaft torque calculating part 521, the input shaft rotational amount detecting part 522, the output shaft rotational amount detecting part 523, the slip amount calculating part 451, the data storing part 452, the abnormal state determining part 453, the reference data storing portion 454 and the memory 455 is the same as that of the input shaft torque calculating part 121, the input shaft rotational amount detecting part 122, the output shaft rotational amount detecting part 123, the slip amount calculating part 124, the data storing part 125, the abnormal state determining part 126, the reference data storing portion 127 and the memory 128 according to the first embodiment.

That is to say the rotating mechanism driving system 600 of the second embodiment has the same configuration as a configuration in which the slip amount calculating part 124, the data storing part 125, the abnormal state determining part 126, the reference data storing portion 127 and the memory 128 of the rotating mechanism driving apparatus 100 according to the first embodiment are transferred into the server 420.

As described above, according to the rotating mechanism driving system 600 of the second embodiment, it becomes possible to distinguish and detect the abnormal states of the photoconductor drum 206 and the traction mechanism 140 by monitoring the input shaft torque and the slip amount similar to the rotating mechanism driving apparatus 100 of the first embodiment.

According to the rotating mechanism driving system 600 of the second embodiment, it is possible to remotely distinguish and detect the abnormal states of the photoconductor drum 206 and the traction mechanism 140 from the server 420.

Since it is possible to remotely identify whether the abnormal state has occurred in the photoconductor drum 206 or the traction mechanism 140, it becomes possible to provide the rotating mechanism driving system 600 and the image forming system 400 including the same that have enhanced convenience and maintainability (simplified maintenance).

The abnormal state processing part 520 is different from the abnormal state processing part 120 in that the abnormal state processing part 520 does not include the slip amount calculating part 451, the data storing part 452, the abnormal state determining part 453, the reference data storing portion 454 and the memory 455 that correspond to the slip amount calculating part 124, the data storing part 125, the abnormal state determining part 126, the reference data storing portion 127 and the memory 128 of the first embodiment. Therefore, it is possible to simplify the configuration of the rotating mechanism driving apparatus 500.

In a case where the photoconductor drums 206Y, 206C, 206M and 206K are connected to the four rotating mechanism driving apparatuses 500, respectively, the server 420 includes the four abnormal state determining parts 450. In this case, the single monitoring part 300 may be commonalized with the four abnormal state determining parts 450, or the four monitoring parts 300 may be connected to the four abnormal state determining parts 450, respectively. Further, the four abnormal state determining parts 450 may be divided into two or three groups, and two or three monitoring parts 300 may be connected to the two or three groups, respectively.

According to the second embodiment, as illustrated in FIG. 14, the rotating mechanism driving apparatus 500 of the rotating mechanism driving system 600 includes the abnormal state processing part 520 having the input shaft torque calculating part 521, the input shaft rotational amount detecting part 522 and the output shaft rotational amount detecting part 523, and the server 420 includes the abnormal state processing part 450 having the slip amount calculating part 451, the data storing part 452, the abnormal state determining part 453, the reference data storing portion 454 and the memory 455.

However, the abnormal state processing part 520 having the input shaft torque calculating part 521, the input shaft rotational amount detecting part 522 and the output shaft rotational amount detecting part 523 may be disposed in the server 420.

Figure 15:
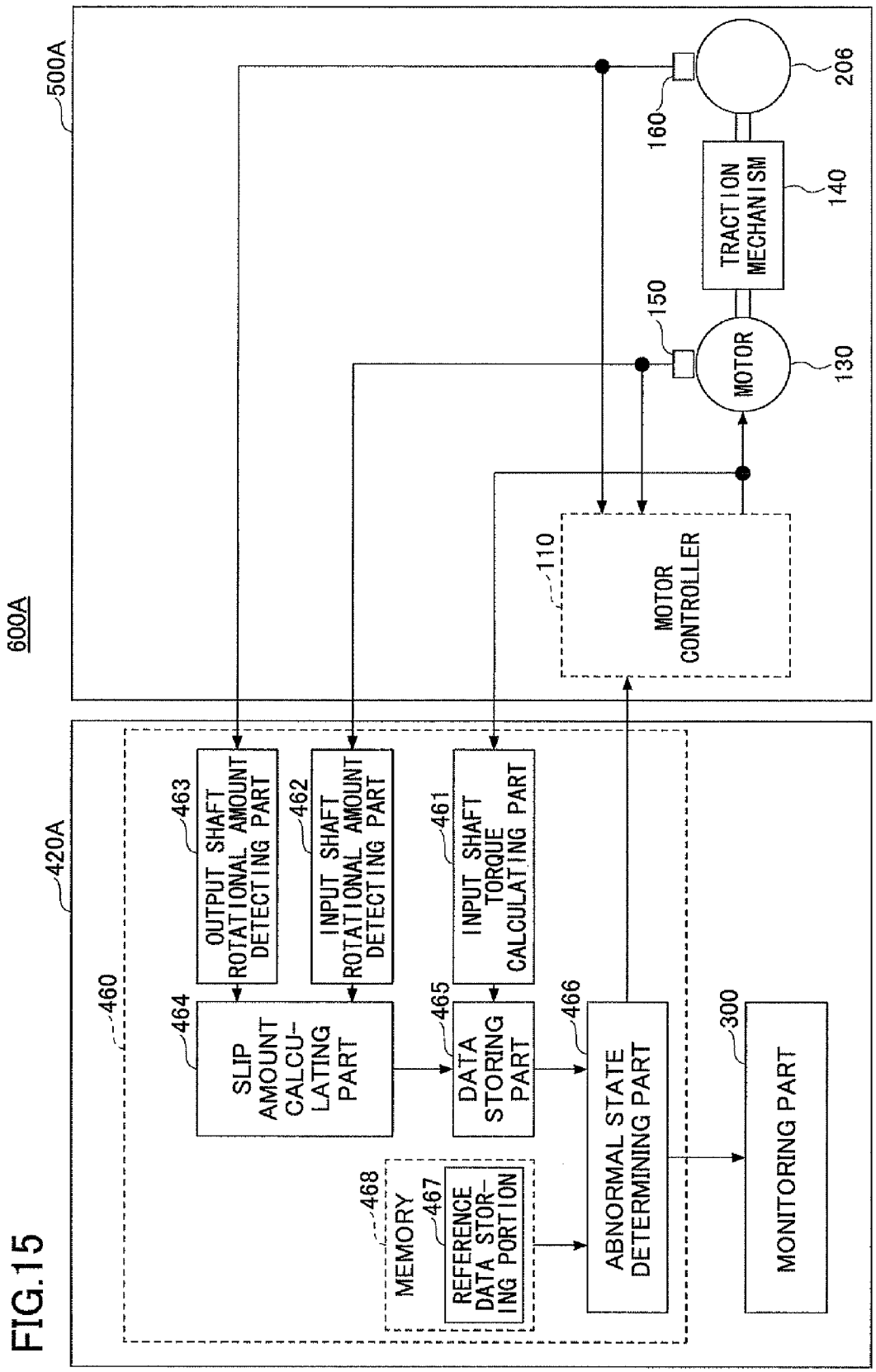
FIG. 15 is a diagram illustrating a rotating mechanism driving system of an exemplary variation of the second embodiment.

FIG. 15 is a diagram illustrating a rotating mechanism driving system 600A of an exemplary variation of the second embodiment.

The rotating mechanism driving system 600A according to the exemplary variation of the second embodiment includes a server 420A and a rotating mechanism driving apparatus 500A.

The rotating mechanism driving apparatus 500A includes the motor controller 110, the motor 130, the traction mechanism 140 and the encoders 150 and 160. As illustrated in FIG. 15, the rotating mechanism driving apparatus 500A is different from the rotating mechanism driving apparatus 500 as illustrated in FIG. 14 in that the rotating mechanism driving apparatus 500A does not include the abnormal state processing part 520.

The server 420A includes an abnormal state processing part 460 and the monitoring part 300. The abnormal state processing part 460 includes an input shaft torque calculating part 461, an input shaft rotational amount detecting part 462, an output shaft rotational amount detecting part 463, a slip amount calculating part 464, a data storing part 465, an abnormal state determining part 466, a reference data storing portion 467 and a memory 468.

The input shaft torque calculating part 461, the input shaft rotational amount detecting part 462, the output shaft rotational amount detecting part 463 and the slip amount calculating part 464 are as same as the input shaft torque calculating part 121, the input shaft rotational amount detecting part 122, the output shaft rotational amount detecting part 123 and the slip amount calculating part 124 according to the first embodiment, respectively.

The data storing part 465, the abnormal state determining part 466, the reference data storing portion 467 and the memory 468 are as same as the data storing part 125, the abnormal state determining part 126, the reference data storing portion 127 and the memory 128 according to the first embodiment, respectively.

In the rotating mechanism driving system 600A of the exemplary variation of the second embodiment, the rotating mechanism driving apparatus 500A does not include a determining part, but the server 420A includes the abnormal state processing part 460 which has the input shaft torque calculating part 461, the input shaft rotational amount detecting part 462, the output shaft rotational amount detecting part 463, the slip amount calculating part 464, the data storing part 465, the abnormal state determining part 466, the reference data storing portion 467 and the memory 468.

In such a configuration, it is possible to remotely distinguish and detect the abnormal states of the photoconductor drum 206 and the traction mechanism 140 from the server 420A in a similar manner to the rotating mechanism driving system 600 as illustrated in FIG. 14.

Since it is possible to remotely identify whether the abnormal state has occurred in the photoconductor drum 206 or the traction mechanism 140, it becomes possible to provide the rotating mechanism driving system 600A and the image forming system including the same that have enhanced convenience and maintainability (simplified maintenance).

Since the input shaft torque calculating part 461, the input shaft rotational amount detecting part 462 and the output shaft rotational amount detecting part 463 are included in the server 420A, the configuration of the rotating mechanism driving apparatus 500A is simplified compared with rotating mechanism driving apparatus 500 as illustrated in FIG. 14.

In a case where the photoconductor drums 206Y, 206C, 206M and 206K are connected to the four rotating mechanism driving apparatuses 500A, respectively, the server 420A includes the four abnormal state determining parts 460. In this case, the single monitoring part 300 may be commonalized with the four abnormal state determining parts 460, or the four monitoring parts 300 may be connected to the four abnormal state determining parts 460, respectively. Further, the four abnormal state determining parts 460 may be divided into two or three groups, and two or three monitoring parts 300 may be connected to the two or three groups, respectively.

The descriptions of the rotating mechanism driving apparatus, the image forming apparatus, the non-transitory readable medium in which the computer program for executing the method for driving the rotating mechanism is recorded, the rotating mechanism driving system and the image forming system of exemplary embodiments have been provided heretofore. The present invention is not limited to these embodiments, but various variations and modifications may be made without departing from the scope of the present invention.

The present application is based on Japanese Priority Application No. 2011-029760 filed on Feb. 15, 2011 and Japanese Priority Application No. 2011-204825 filed on Sep. 20, 2011 with the Japanese Patent Office, the entire contents of which are hereby incorporated herein by reference.

What is claimed is:
1. A rotating mechanism driving apparatus comprising:
a motor;

a frictional transmission configured to output torque via a viscous fluid, the torque being input from the motor;

an input shaft rotational amount detecting part configured to detect a rotational amount of an input shaft of the frictional transmission;

an output shaft rotational amount detecting part configured to detect a rotational amount of an output shaft of the frictional transmission;

an input torque detecting part configured to detect input torque of the frictional transmission;

a slip amount calculating part configured to calculate a slip amount of the output shaft with regard to the input shaft based on difference between the rotational amount of the input shaft and the rotational amount of the output shaft; and an abnormal state determining part configured to distinctively determine first occurrence of an abnormal state of a rotating mechanism connected to the output shaft of the frictional transmission and second occurrence of an abnormal state of the frictional transmission based on a first comparison result of the input torque and a reference torque that is determined in advance and a second comparison result of the slip amount calculated by the slip amount calculating part and a reference slip amount which increases with increased amount of the input shaft torque.

2. The rotating mechanism driving apparatus as claimed in claim 1, wherein the reference slip amount is obtained by adding a designated permissible slip amount to a standard slip amount of the frictional transmission.

3. The rotating mechanism driving apparatus as claimed in claim 1, wherein the reference slip amount is determined by reference characteristics in that the reference slip amount increases with increased amount of the input shaft torque, and wherein the reference characteristics are obtained by adding a designated permissible slip amount to standard characteristics of a standard slip amount of the frictional transmission.

4. The rotating mechanism driving apparatus as claimed in claim 3 further comprising:
a data storing portion configured to store data representing the reference characteristics.

5. The rotating mechanism driving apparatus as claimed in claim 1 further comprising:
a first rotation detecting part configured to detect rotation of the input shaft of the frictional transmission,
wherein the input shaft rotational amount detecting part detects the rotational amount of the input shaft based on the rotation of the input shaft detected by the first rotation detecting part.

6. The rotating mechanism driving apparatus as claimed in claim 1 further comprising;
a second rotation detecting part configured to detect rotation of the output shaft of the frictional transmission, and wherein
the output shaft rotational amount detecting part detects the rotational amount of the output shaft based on the rotation of the output shaft detected by the second rotation detecting part.

7. The rotating mechanism driving apparatus as claimed in claim 1, wherein the input torque detecting part detects the input torque based on voltage supplied to the motor.

8. The rotating mechanism driving apparatus as claimed in claim 1, wherein the frictional transmission is a viscous coupling device, a torque converter or a fluid clutch.

9. An image forming apparatus comprising:
a photoconductor drum on which a latent image is formed;
an endless transferring body configured to transfer a developed image transferred from the photoconductor drum;
a drive roller configured to drive the endless transferring body;
a transfer roller configured to transfer the developed image transferred by the endless transferring body to a transfer paper;
a fuser roller configured to fix a toner image transferred on the transfer paper; and
the rotating mechanism driving apparatus as claimed in claim 1 and configured to perform drive control of the photoconductor drum, the drive roller, the transfer roller or the fuser roller.

10. A non-transitory computer readable medium in which a computer program for executing a method for driving a rotating mechanism is recorded, the method comprising:
detecting a rotational amount of an input shaft of a frictional transmission;
detecting a rotational amount of an output shaft of the frictional transmission;
detecting input torque of the frictional transmission;
calculating a slip amount of the output shaft with regard to the input shaft based on difference between the rotational amount of the input shaft and the rotational amount of the output shaft;
determining first occurrence of an abnormal state of a rotating mechanism connected to the output shaft of the frictional transmission; and
determining second occurrence of an abnormal state of the frictional transmission based on a first comparison result of the input torque and a reference torque that is determined in advance and a second comparison result of the calculated slip amount and a reference slip amount which increases with increased amount of the input shaft torque.

11. A rotating mechanism driving system comprising:
a rotating mechanism driving apparatus including a motor and a frictional transmission configured to output torque via a viscous fluid, the torque being input from the motor;
an input shaft rotational amount detecting part configured to detect a rotational amount of an input shaft of the frictional transmission;
an output shaft rotational amount detecting part configured to detect a rotational amount of an output shaft of the frictional transmission;
an input torque detecting part configured to detect input torque of the frictional transmission;
a slip amount calculating part configured to calculate a slip amount of the output shaft with regard to the input shaft based on difference between the rotational amount of the input shaft and the rotational amount of the output shaft; and
an abnormal state determining part configured to distinctively determine first occurrence of an abnormal state of a rotating mechanism connected to the output shaft of the frictional transmission and second occurrence of an abnormal state of the frictional transmission based on a first comparison result of the input torque and a reference torque that is determined in advance and a second comparison result of the slip amount calculated by the slip amount calculating part and a reference slip amount which increases with increased amount of the input shaft torque.

12. An image forming system comprising:
a photoconductor drum on which a latent image is formed;

an endless transferring body configured to transfer a developed image transferred from the photoconductor drum;

a drive roller configured to drive the endless transferring body;

a transfer roller configured to transfer the developed image transferred by the endless transferring body to a transfer paper;

a fuser roller configured to fix a toner image transferred on the transfer paper; and the rotating mechanism driving system as claimed in claim 11 and configured to perform drive control of the photoconductor drum, the drive roller, the transfer roller or the fuser roller.

* * * * *